(12) United States Patent  
Kimura

(10) Patent No.: US 8,994,990 B2  
(45) Date of Patent: Mar. 31, 2015

(54) SYSTEM MANAGEMENT SERVER, AND MANAGEMENT METHOD AND PROGRAM

(75) Inventor: Mitsuo Kimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 151 days.

(21) Appl. No.: 13/448,247

(22) Filed: Apr. 16, 2012

(65) Prior Publication Data

US 2012/0287462 A1 Nov. 15, 2012

(30) Foreign Application Priority Data

May 11, 2011 (JP) ................................. 2011-106626

(51) Int. Cl.
*G06F 3/12* (2006.01)

(52) U.S. Cl.
CPC ............ *G06F 3/1203* (2013.01); *G06F 3/1259* (2013.01); *G06F 3/1273* (2013.01); *G06F 3/1288* (2013.01); *G06F 3/1239* (2013.01)
USPC .. 358/1.15; 358/1.16; 358/400; 707/E17.005; 707/E17.01

(58) Field of Classification Search
None
See application file for complete search history.

(56) References Cited

U.S. PATENT DOCUMENTS

| 7,107,419 | B1 * | 9/2006 | Ghemawat et al. ........... 711/162 |
| 7,359,075 | B2 | 4/2008 | Kimura |
| 7,827,286 | B1 | 11/2010 | Deflaux et al. |
| 2006/0279781 | A1 * | 12/2006 | Kaneko ........................ 358/1.15 |
| 2007/0055703 | A1 * | 3/2007 | Zimran et al. ................ 707/200 |
| 2008/0068643 | A1 * | 3/2008 | Yasunaga ..................... 358/1.15 |
| 2009/0281847 | A1 * | 11/2009 | Hamilton et al. .................. 705/7 |
| 2010/0017415 | A1 | 1/2010 | Kurumai et al. |
| 2010/0171973 | A1 | 7/2010 | Kimura |
| 2010/0223436 | A1 * | 9/2010 | Yamagishi et al. ........... 711/156 |
| 2012/0226672 | A1 * | 9/2012 | Hayashi et al. ............... 707/698 |

FOREIGN PATENT DOCUMENTS

JP 2010-26653 A 2/2010

OTHER PUBLICATIONS

European Search Report dated Mar. 21, 2014 issued in corresponding European Patent Application No. 12164783.8.

* cited by examiner

*Primary Examiner* — Vincent Rudolph
*Assistant Examiner* — Richa Mishra
(74) *Attorney, Agent, or Firm* — Fitzpatrick, Cella, Harper & Scinto

(57) ABSTRACT

A system management server in a printing system assigns print document information and printing device information of a tenant to a plurality of servers to perform distributed management. When print document information and printing device information of a given tenant are divided and moved, the plurality of servers are searched for a server for managing the given tenant. When the found server is allowed to store the divided print document information and printing device information, the server is determined to be a destination server of the movement. The divided print document information and printing device information are moved to the determined destination server.

8 Claims, 23 Drawing Sheets

| DATABASE NAME | INTEGER VALUE | SERVER IP ADDRESS |
|---:|---:|---:|
| A-1 | 0 | 192.168.1.1 |
| A-2 | 357913941 | 192.168.1.1 |
| A-3 | 715827882 | 192.168.1.2 |
| A-4 | 1073741823 | 192.168.1.2 |
| A-5 | 1431655764 | 192.168.1.3 |
| A-6 | 1789569705 | 192.168.1.3 |

FIG. 11

| DATABASE NAME | INTEGER VALUE | SERVER IP ADDRESS |
|---|---|---|
| A-1 | 0 | 192.168.1.1 |
| A-2 | 715827882 | 192.168.1.1 |
| A-3 | 1431655764 | 192.168.1.3 |

1101

| DATABASE NAME | INTEGER VALUE | SERVER IP ADDRESS |
|---|---|---|
| B-1 | 0 | 192.168.1.2 |
| B-2 | 1073741823 | 192.168.1.2 |

1102

| DATABASE NAME | INTEGER VALUE | SERVER IP ADDRESS |
|---|---|---|
| C-1 | 0 | 192.168.1.3 |

| DATABASE NAME | INTEGER VALUE | SERVER IP ADDRESS |
|---|---|---|
| A-1 | 0 | 192.168.1.1 |
| A-2 | 715827882 | 192.168.1.1 |
| A-3 | 1431655764 | 192.168.1.3 |

~2301

| DATABASE NAME | INTEGER VALUE | SERVER IP ADDRESS |
|---|---|---|
| B-1 | 0 | 192.168.1.2 |
| B-2 | 1073741823 | 192.168.1.2 |

~2302

| DATABASE NAME | INTEGER VALUE | SERVER IP ADDRESS |
|---|---|---|
| C-1 | 0 | 192.168.1.3 |

~2303

⇩

| DATABASE NAME | INTEGER VALUE | SERVER IP ADDRESS |
|---|---|---|
| A-1 | 0 | 192.168.1.1 |
| A-2 | 715827882 | 192.168.1.1 |
| A-3 | 1431655764 | 192.168.1.3 |

~2304

| DATABASE NAME | INTEGER VALUE | SERVER IP ADDRESS |
|---|---|---|
| B-1 | 0 | 192.168.1.2 |
| B-2 | 1073741823 | 192.168.1.2 |

~2305

| DATABASE NAME | INTEGER VALUE | SERVER IP ADDRESS |
|---|---|---|
| C-1 | 0 | 192.168.1.4 |
| C-2 | 1073741823 | 192.168.1.4 |

~2306

SYSTEM MANAGEMENT SERVER, AND MANAGEMENT METHOD AND PROGRAM

BACKGROUND OF THE INVENTION

1. Field of the Invention

The present invention relates to system management servers, and management methods and programs in a printing system in which print document information and printing device information of a tenant are assigned to a plurality of servers to perform distributed management.

2. Description of the Related Art

Conventionally, there is a known print document management system which manages document data to be printed and printers (print destinations). The print document management system receives document data from a user application or another document management system, produces print document information, and holds the print document information in association with the document data. Thereafter, the print document management system executes a printing process in response to a user's request for execution of printing, and adds the result of the printing process to the print document information.

In recent years, as the Internet has become widespread and the speed of networks has increased, functions conventionally provided by software have been more often provided as services on the Internet. The print document management system is also used as a back end for such services. Note that if a service is provided on the Internet, it is necessary to provide the service to a plurality of tenants (contracting entities (units), such as companies etc.).

In a data management method which is used when a service is provided to a plurality of tenants, a database is typically divided into areas for the respective tenants. Japanese Patent Laid-Open No. 2010-026653 proposes a data access control technique which can facilitate the development of an application which accesses a database having different data areas for respective tenants.

However, the print document management system serving as a back end for a service on the Internet needs to handle a much larger number of users, print documents, and printers than the number of those of an intranet. Therefore, the print document management system needs to be configured so that a plurality of servers can form a cluster. The print document management system also needs to be configured to handle an increased number of users, print documents, and printers by increasing the number of servers (scaling out). As a technique of achieving such a configuration, there is a distributed data technique called consistent hashing.

However, when a separate system (server) is assigned to each tenant, the operating ratio of a system (server) which provides a service to a small-scale tenant is low, leading to high operation cost of the entire service. On the other hand, when a single system provides a print service to a plurality of tenants, then if data is distributed without considering the tenants, the cost of a process which is performed on a tenant-by-tenant basis (e.g., scaling out) increases.

SUMMARY OF THE INVENTION

The present invention provides a method and device which can easily perform a process on a tenant-by-tenant basis while reducing the operational cost of an entire service.

According to an embodiment of the present invention, there is provided a system management server for assigning print document information and printing device information of a tenant to a plurality of servers to perform distributed management in a printing system, the server comprising: a search unit configured to search the plurality of servers for a server for managing a given tenant when print document information and printing device information of the given tenant are divided and moved; a determination unit configured to determine the server found by the search unit to be a destination server of the movement when the server is allowed to store the divided print document information and printing device information; and a movement unit configured to move the divided print document information and printing device information to the destination server determined by the determination unit.

Further features of the present invention will become apparent from the following description of exemplary embodiments with reference to the attached drawings.

BRIEF DESCRIPTION OF THE DRAWINGS

FIG. 11 is a diagram schematically showing distributed management using assignment information (database list).

FIG. 23 is a diagram schematically showing a process of moving a database obtained by division as shown in FIG. 22B, using the assignment information (database list) of FIG. 6B.

DESCRIPTION OF THE EMBODIMENTS

Embodiments of the present invention will be described in detail hereinafter with reference to the attached drawings. Firstly, a print document management system in which an embodiment of the present invention will be carried out will be described with reference to FIG. 1 which is a diagram showing an entire configuration of the print document management system.

Figure 1:
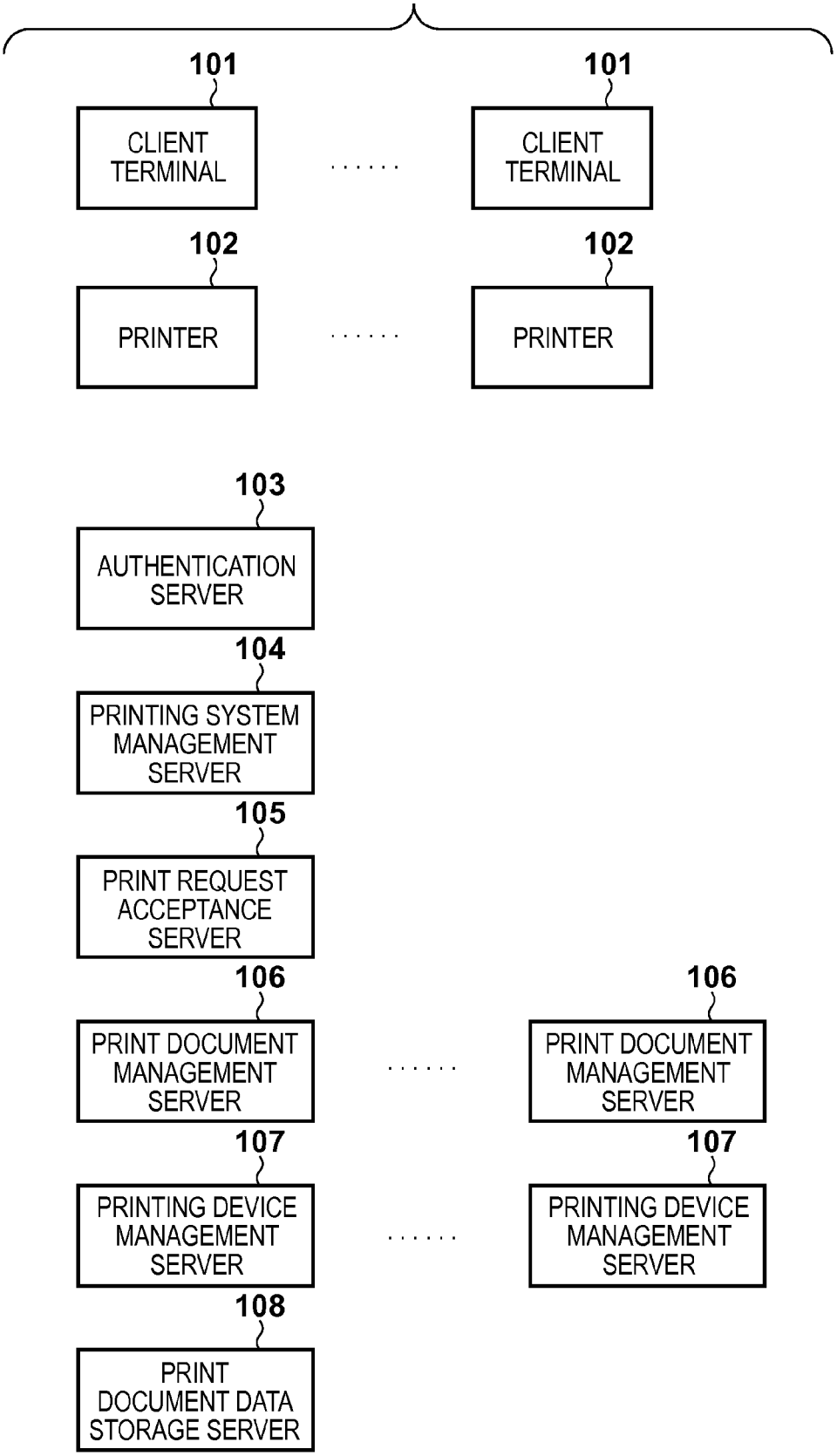
FIG. 1 is a diagram showing an entire configuration of a print document management system.

As shown in FIG. 1, the print document management system includes a plurality of client terminals 101, a plurality of printers 102, an authentication server 103, and a printing system management server 104. The print document management system also includes a print request acceptance server 105, a plurality of print document management servers 106, a plurality of printing device management servers 107, and a print document data storage server 108.

Note that the terminals, the printers, and the servers included in the print document management system are connected together via a communication line (not shown). The communication line may be a so-called communication network which is implemented using one or a combination of a LAN and a WAN (e.g., the Internet, an intranet, etc.), a telephone line, a dedicated digital line, an ATM or frame relay line, a cable television line, a data broadcast wireless line, etc. The communication line may be any line that can be used to transmit and receive data, and different communication protocols may be used between the client terminals 101, the printers 102, and the servers.

The client terminal 101 may be, for example, a desk-top personal computer, a notebook personal computer, a mobile personal computer, a personal data assistant (PDA), etc., or may be a mobile telephone including an environment in which a program can be executed. The printer 102 may be a printer (e.g., a laser beam printer etc.) which can be connected to a network.

The authentication server 103 supports a protocol such as LDAP etc., provides a directory service, and manages user information in this system. The authentication server 103 performs user authentication in response to a request from the client terminal 101.

The printing system management server 104 manages this entire system. The printing system management server manages assignment information of the print document management servers 106 and print document information, and assignment information of the printing device management servers 107 and printing devices. The print request acceptance server 105 receives a print request from the client terminal 101 and returns a response.

The print document management server 106 manages a state of print document data stored in the print document data storage server 108. In response to a print request, the printing device management server 107 reads print document data stored in the print document data storage server 108, converts the print document data into a format which can be interpreted by the printer 102, and transmits the resulting print document data to the printer. The printing device management server also monitors and tracks a print job of the printer 102 until printing is completed.

The print document data storage server 108 holds print document data in association with print document information in a storage which can be connected directly to a network, such as a file server which supports a file sharing protocol such as SMB etc., a SAN, a NAS, etc. Here, SAN is an abbreviation for storage area network, and NAS is an abbreviation for network attached storage.

Figure 2:
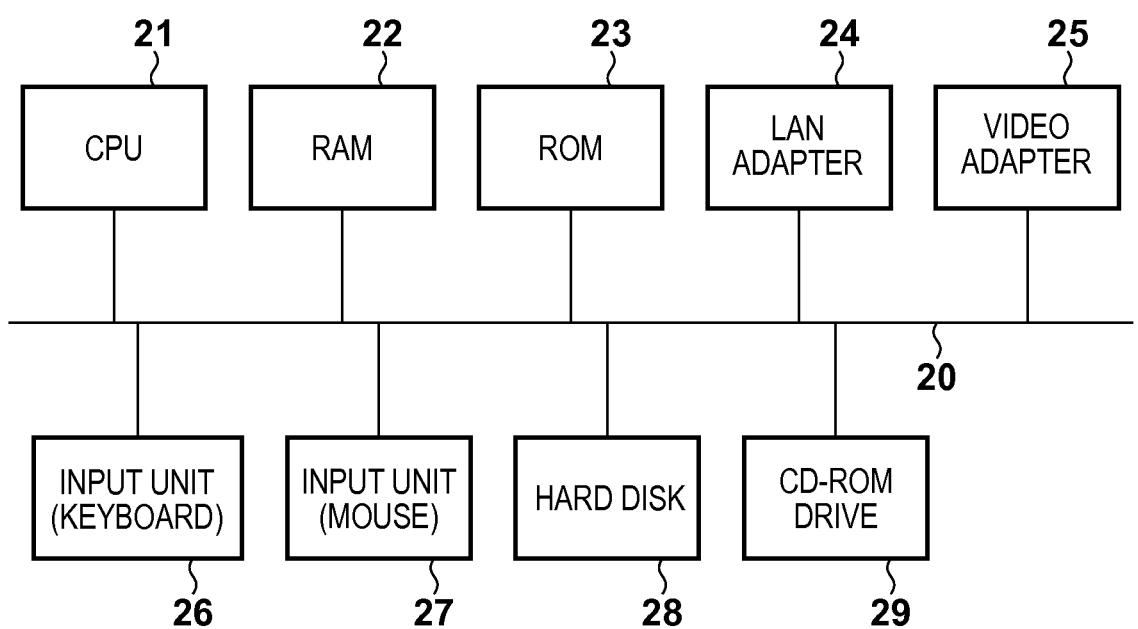
FIG. 2 is a block diagram showing a hardware configuration of a client terminal and each server.

Next, a configuration of the client terminal 101, the authentication server 103, the printing system management server 104, the print request acceptance server 105, the print document management server 106, the printing device management server 107, and the print document data storage server 108 will be described with reference to FIG. 2. FIG. 2 is a block diagram showing a basic hardware configuration of these devices.

In FIG. 2, a CPU 21, a RAM 22, a LAN adaptor 24, a video adaptor 25, an input unit (keyboard) 26, an input unit (mouse) 27, a hard disk 28, and a CD-ROM drive 29 are connected together via a system bus 20. The system bus 20 may include, for example, a PCI bus, an AGP bus, a memory bus, etc. Note that, in FIG. 2, a chip for connection between each bus, a keyboard interface, and an input/output interface (e.g., so-called SCSI or ATAPI, etc.) are not shown.

The CPU 21 performs various operations, such as four arithmetic operations, comparison operations, etc., and controls hardware, based on a program of an operating system or an application program. The RAM 22 is used to store a program of an operating system or an application program which is read from the hard disk 28 or a storage medium (e.g., a CD-ROM, a CD-R, etc.) loaded in the CD-ROM drive 29. These programs are executed by the CPU 21.

The ROM 23 stores, for example, a so-called BIOS, which controls input/output of data to/from the hard disk 28 etc. in cooperation with an operating system. The LAN adaptor 24 controls communication with an external device connected thereto via a network, in cooperation with a communication program of an operating system controlled by the CPU 21. The video adaptor 25 generates an image signal which is to be output to a display device. The keyboard 26 and the mouse 27 are used to input an instruction to the client terminal 101.

The hard disk 28 stores an operating system and an application program (e.g., a print document management system program etc.). The CD-ROM drive 29 is used to install into the hard disk 28 an application program read from a storage medium such as a CD-ROM, a CD-R, a CD-R/W, etc. which is loaded therein. Note that a CD-R drive, a CD-R/W drive, a DVD drive, etc. may of course be used.

Figure 3A:
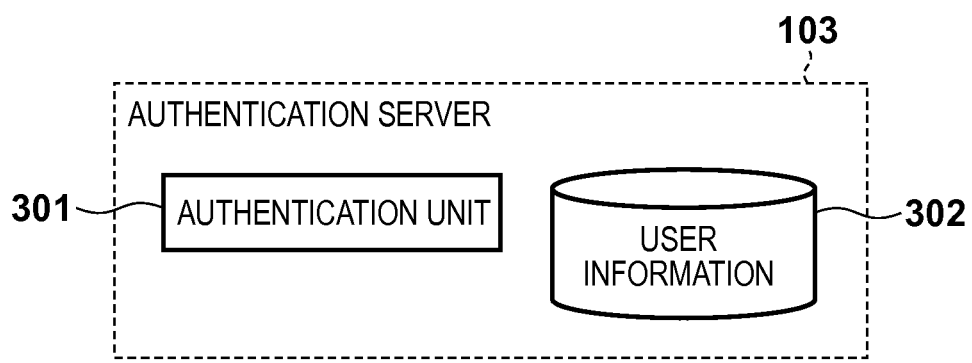
FIG. 3A is a diagram showing a software configuration of an authentication server.

FIGS. 3A to 5B are diagrams showing software configurations of the servers included in this system. Note that FIG. 3A is a diagram showing a software configuration of the authentication server 103. The authentication server 103 holds user information 302. The authentication server includes an authentication unit 301 which accepts an authentication request from the client terminal 101, and performs authentication based on the user information 302.

Figure 3B:
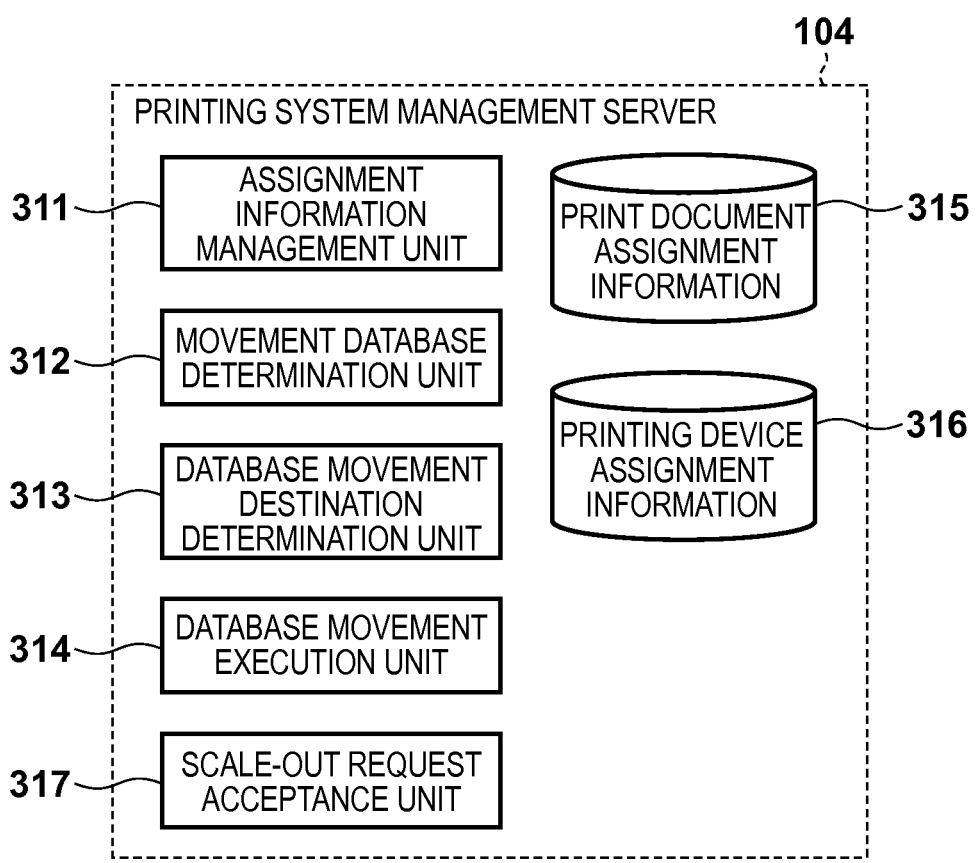
FIG. 3B is a diagram showing a software configuration of a printing system management server.

FIG. 3B is a diagram showing a software configuration of the printing system management server 104. The printing system management server 104 holds print document assignment information 315 indicating assignment of the print document management servers 106 and print document information, and printing device assignment information 316 indicating assignment of the printing device management servers 107 and printing devices. The printing system management server includes an assignment information management unit 311 which manages the print document assignment information 315 and the printing device assignment information 316. The printing system management server also includes a scale-out request acceptance unit 317 which accepts a scale-out request on a tenant-by-tenant basis when scaling out is performed for a tenant (division and movement of a database). The printing system management server also includes a movement database determination unit 312 which determines a database which is to be moved when scaling out is executed, a database movement destination determination unit 313 which determines a server which is a destination of the database to be moved, and a database movement execution unit 314 which executes movement of the database.

Figure 4A:
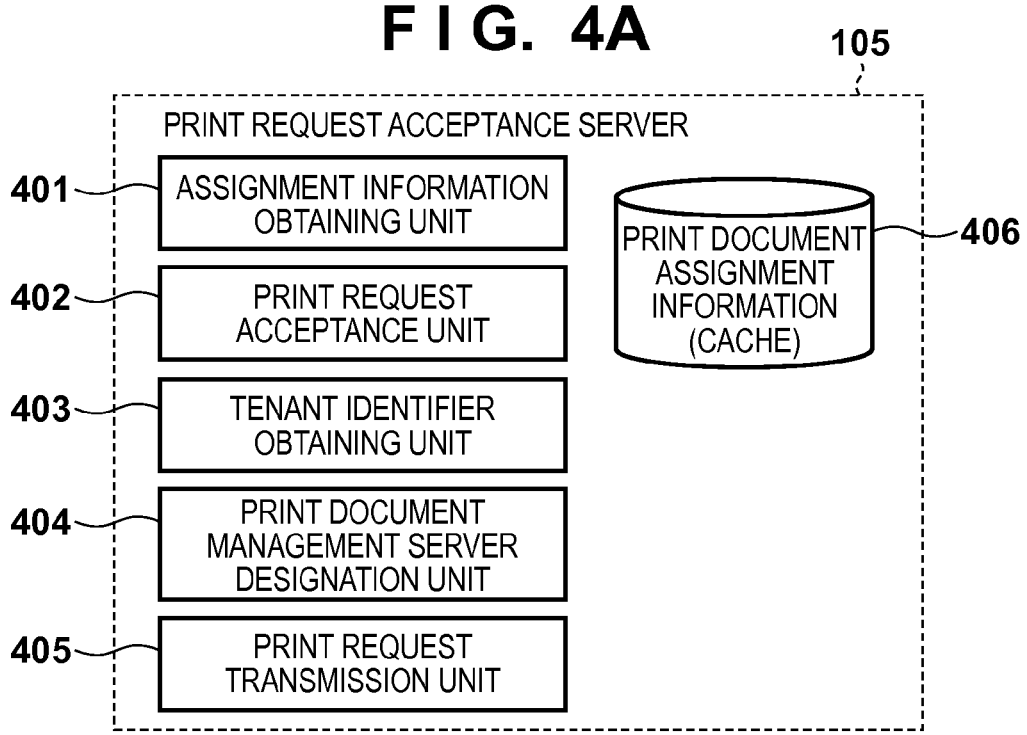
FIG. 4A is a diagram showing a software configuration of a print request acceptance server.

FIG. 4A is a diagram showing a software configuration of the print request acceptance server 105. The print request acceptance server 105 holds print document assignment information (cache) 406 which is obtained from the printing system management server 104. The print request acceptance server includes an assignment information obtaining unit 401 which obtains print document assignment information from the printing system management server 104. The print request acceptance server also includes a print request acceptance unit 402 which accepts a print request from the client terminal 101, and a tenant identifier obtaining unit 403 which obtains a tenant identifier from the authentication server 103. The print request acceptance server also includes a print document management server designation unit 404 which designates a print document management server 106 based on the print document assignment information (cache) 406, and a print request transmission unit 405 which transmits a print request to the print document management server 106.

Figure 4B:
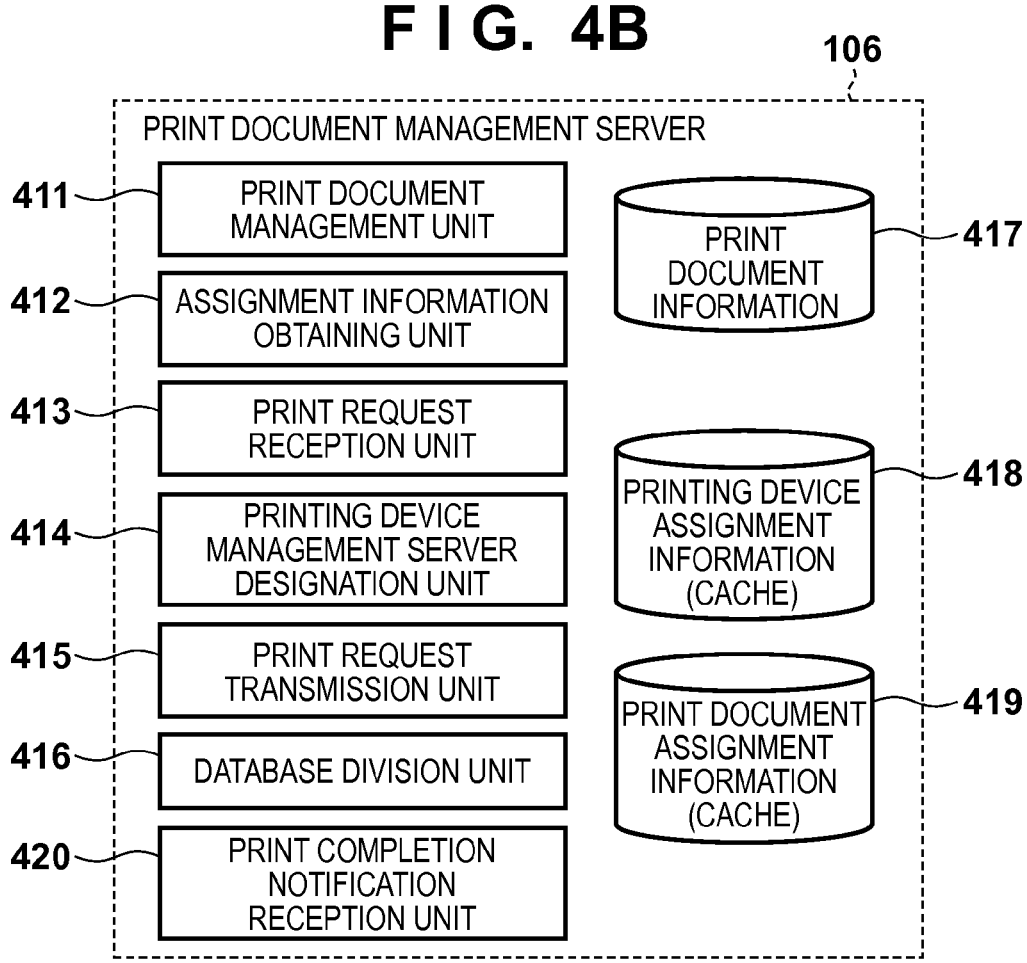
FIG. 4B is a diagram showing a software configuration of a print document management server.

FIG. 4B is a diagram showing a software configuration of the print document management server 106. The print document management server 106 holds print document information 417 which is used to manage a state of print document data stored in the print document data storage server 108. The print document management server also holds printing device assignment information (cache) 418 and print document assignment information (cache) 419 which are obtained from the printing system management server 104. The print document management server includes a print document management unit 411 which manages the print document information 417. The print document management server also includes an assignment information obtaining unit 412 which obtains printing device assignment information from the printing system management server 104. The print document management server also includes a print request reception unit 413 which receives a print request from the print request acceptance server 105. The print document management server also includes a printing device management server designation unit 414 which designates a printing device management server 107 based on the printing device assignment information (cache) 418, and a print request transmission unit 415 which transmits a print request to the printing device management server 107. The print document management server also includes a print completion notification reception unit 420 which receives a print completion notification from the printing device management server 107. The print document management server also includes a database division unit 416 which divides a database in accordance with an instruction from the printing system management server 104.

Figure 5A:
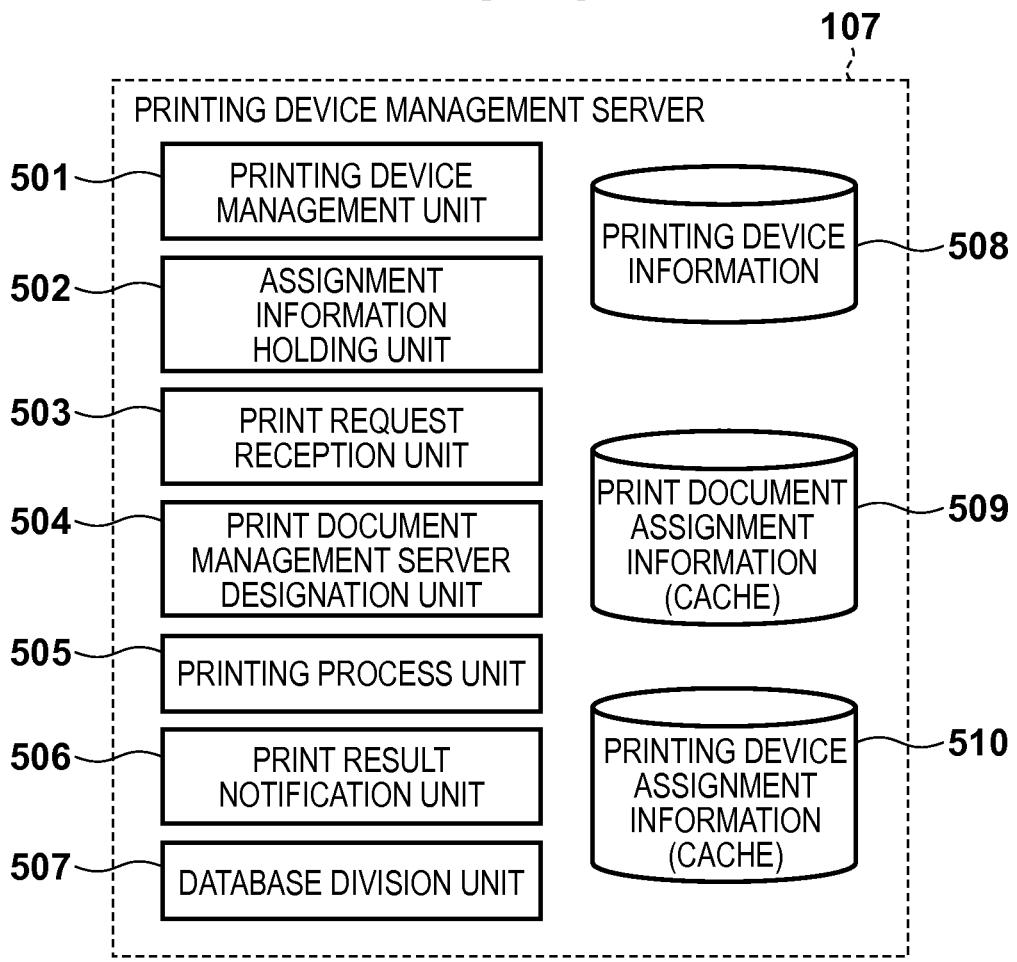
FIG. 5A is a diagram showing a software configuration of a printing device management server.
Figure 5B:
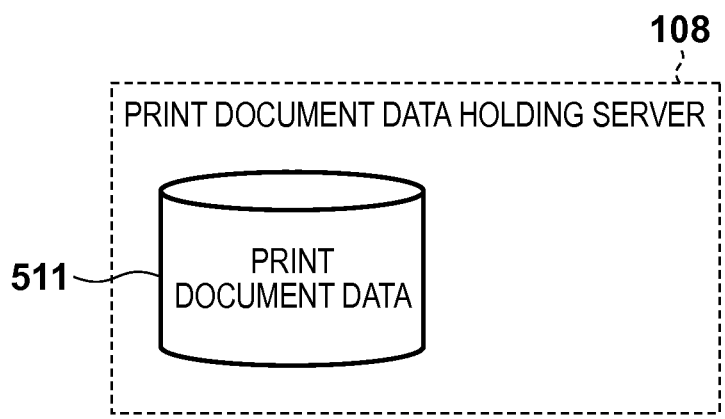
FIG. 5B is a diagram showing a configuration of a print document data storage server.

FIG. 5A is a diagram showing a software configuration of the printing device management server 107. The printing device management server 107 holds printing device information 508 which is used to manage the printer 102. The printing device management server also holds print document assignment information (cache) 509 and printing device assignment information (cache) 510 which are obtained from the printing system management server 104. The printing device management server includes a printing device management unit 501 which manages the printing device information 508. The printing device management server also includes an assignment information obtaining unit 502 which obtains print document assignment information from the printing system management server 104. The printing device management server also includes a print request reception unit 503 which receives a print request from the print document management server 106. The printing device management server also includes a print document management server designation unit 504 which designates a print document management server 106 based on the print document assignment information (cache) 509, and a print result notification unit 506 which notifies the print document management server 106 of the print result. The printing device management server also includes a database division unit 507 which divides a database in accordance with an instruction from the printing system management server 104. FIG. 5B is a diagram showing a configuration of the print document data storage server 108. The print document data storage server 108 holds print document data 511.

Figure 6A:
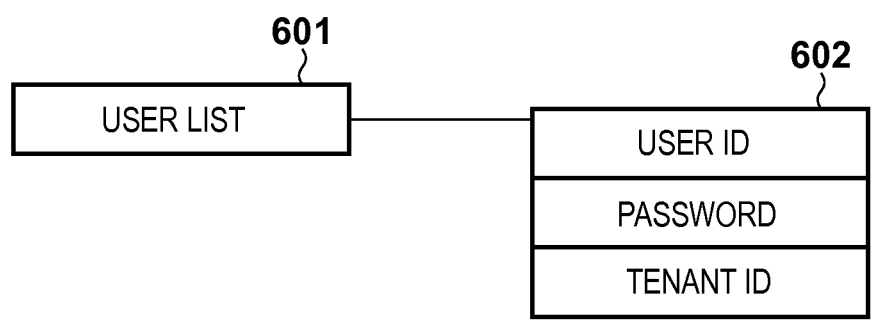
FIG. 6A is a diagram showing user information held by the authentication server.

The information items held by the servers included in this system will now be described with reference to FIGS. 6A to 8. FIG. 6A is a diagram showing the user information 302 held by the authentication server 103. The user information 302 contains a user list 601. The user list 601 contains a list of individual-user information 602 containing a user ID, password, and tenant ID of each user.

Figure 6B:
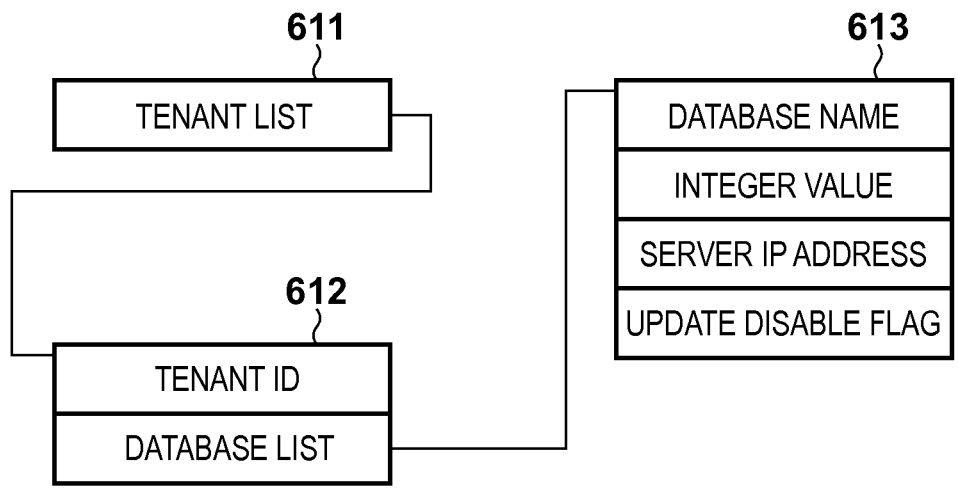
FIG. 6B is a diagram showing print document assignment information and printing device assignment information held by the printing system management server.

FIG. 6B is a diagram showing the print document assignment information 315 and the printing device assignment information 316 held by the printing system management server 104. The print document assignment information 315 and the printing device assignment information 316 have the same structure and are collectively referred to as assignment information. Also shown are the print document assignment information (cache) 406 held by the print request acceptance server 105, the printing device assignment information (cache) 418 held by the print document management server 106, and the print document assignment information (cache) 509 held by the printing device management server 107.

Here, the assignment information contains a tenant list 611. The tenant list 611 contains a list of individual-tenant information 612 containing a tenant ID and database list of each tenant. The database list contains a list of individual-database information 613 containing a database name, integer value, server IP address, and update disable flag of each database.

Figure 7:
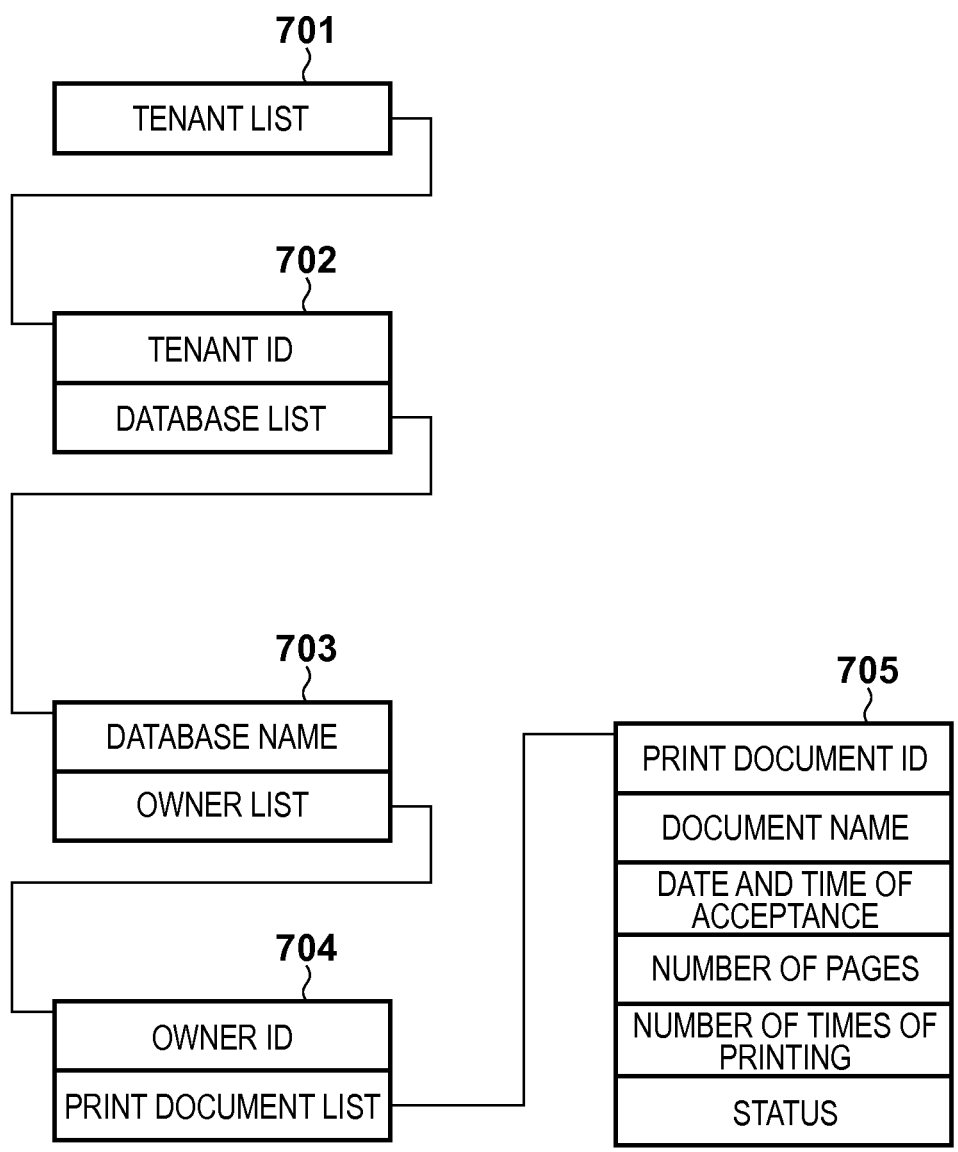
FIG. 7 is a diagram showing print document information held by the print document management server.

FIG. 7 is a diagram showing the print document information 417 held by the print document management server 106. The print document information 417 contains a tenant list 701. The tenant list 701 contains a list of individual-tenant information 702 containing a tenant ID and database list of each tenant. The database list contains a list of individual-database information 703 containing a database name and owner list of each database. The owner list contains a list of individual-owner information 704 containing an owner ID and a print document list. The print document list contains a list of individual-print document information 705 containing a print document ID, a document name, the date and time of acceptance, the number of pages, the number of times of printing, and a status.

Figure 8:
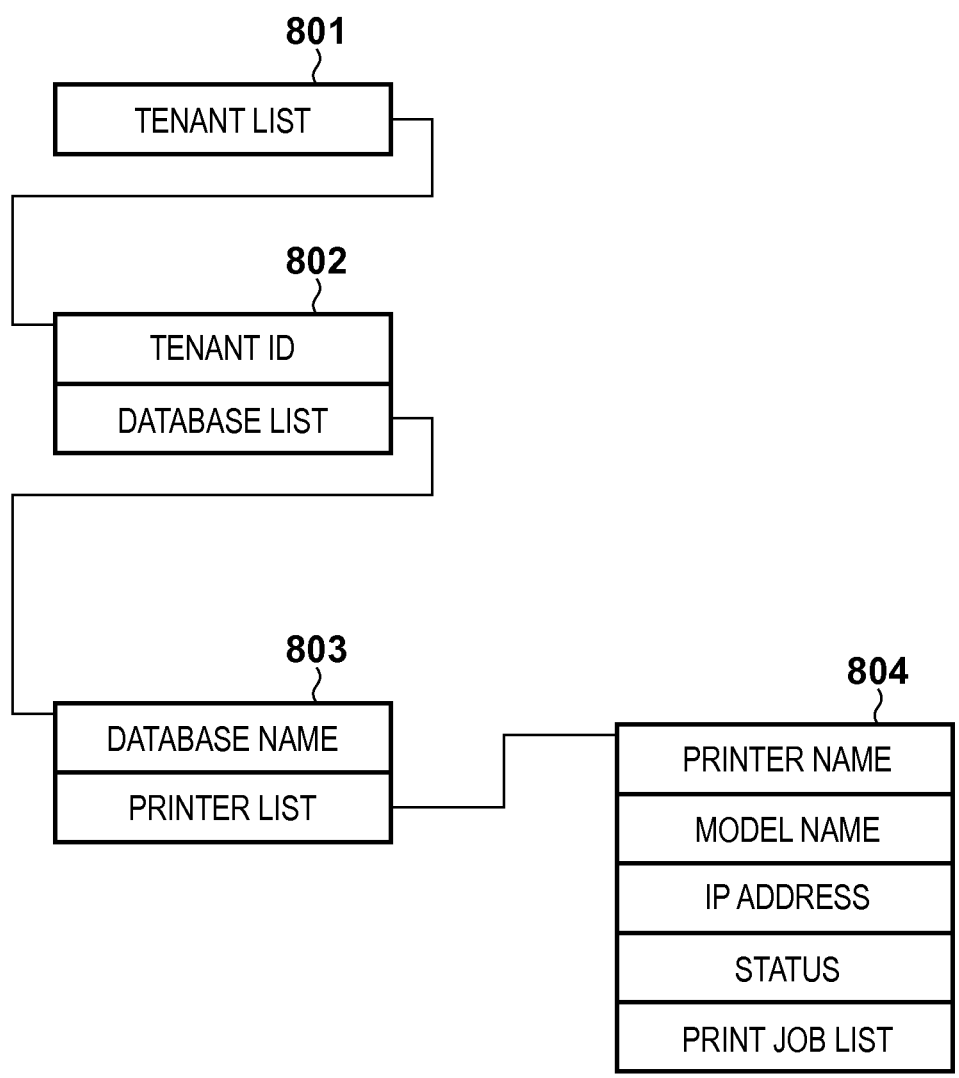
FIG. 8 is a diagram showing printing device information held by the printing device management server.

FIG. 8 is a diagram showing the printing device information 508 held by the printing device management server 107. The printing device information 508 contains a tenant list 801. The tenant list 801 contains a list of individual-tenant information 802 containing a tenant ID and database list of each tenant. The database list contains a list of individual-database information 803 containing a database name and printer list of each database. The printer list contains a list of individual-printing device information 804 containing a printer name, a model name, an IP address, a status, and a print job list.

Figures 9A, 9B:
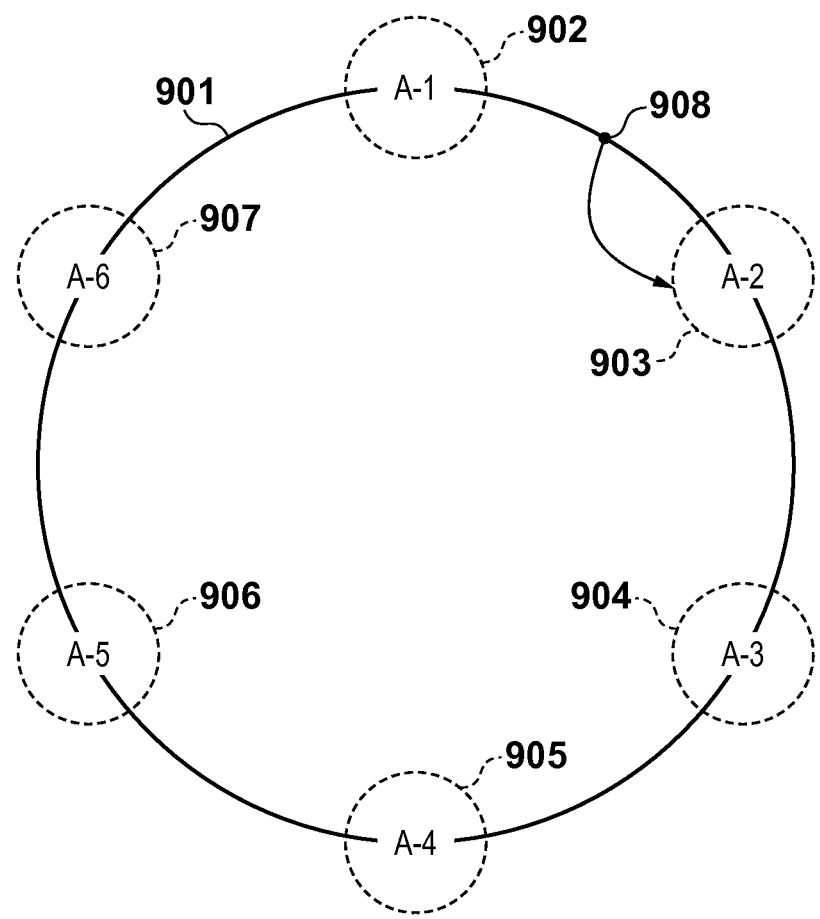
FIG. 9A is a diagram schematically showing the way in which distributed management is performed by a plurality of servers.
FIG. 9B is a diagram showing assignment information (database list).

Next, the way in which print document information or printing device information is managed in a distributed manner in this system will be described with reference to FIGS. 9A to 11. FIG. 9A is a diagram schematically showing the way in which print document information or printing device information is managed in a distributed manner using a plurality of servers. This diagram shows a ring 901 on which a value next to a maximum value is zero, in an integer value space. This diagram also shows databases 902 to 907 associated with respective integer values on the ring 901. An integer value on the ring 901 is assigned to the first database encountered as one progresses clockwise on the ring. Here, an integer value 908 on the ring 901 is assigned to a database 903 which is the first database encountered as one progresses clockwise on the ring.

In this system, for print document information, a database is determined to which a hash value calculated from the ID of the owner of a print document is assigned as an integer value on the ring 901. For printing device information, a database is determined to which a hash value calculated from the printer name of a printing device is assigned as an integer value on the ring 901.

FIG. 9B is a diagram schematically showing the distributed management of FIG. 9A using the assignment information (database list) of FIG. 6B. A database has, as its attributes, a database name for identifying the database and an integer value on the ring 901 of FIG. 9A. For example, if a hash value calculated from the ID of the owner of a print document is between the integer value 0 of a database "A-1" and the integer value 357913941 of a database "A-2," the print document information is stored in the database "A-2." If the hash value is between the integer value of the database "A-2" and the integer value of a database "A-3," the print document information is stored in the database "A-3." If the hash value is greater than the integer value 1789569705 of a database "A-6," the print document information is stored in the database "A-1." A database also has, as its attribute, the IP address of a server to which the database is assigned.

In this system, a server holds at least one database. Print document information is stored in a database held by the print document management server 106, and printing device information is stored in a database held by the printing device management server 107.

Figure 10:
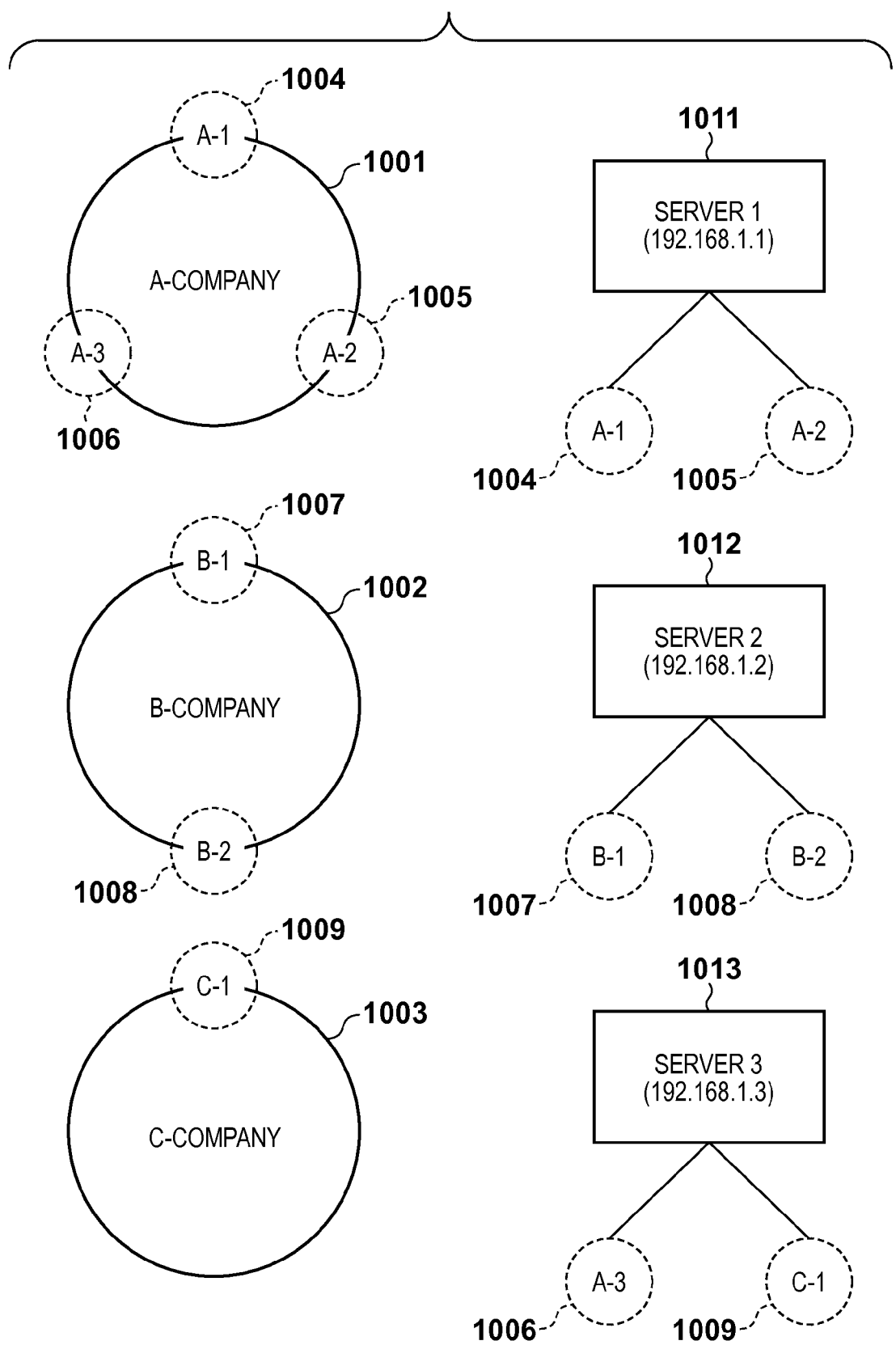
FIG. 10 is a diagram schematically showing the way in which print document information or printing device information is managed in a distributed manner in a plurality of servers for each tenant.

FIG. 10 is a diagram schematically showing the way in which print document information or printing device information is managed in a distributed manner in a plurality of servers for each tenant. This diagram shows that the ring 901 of FIG. 9A is provided for each of tenants, an A-company 1001, a B-company 1002, and a C-company 1003. This diagram also shows databases 1004 to 1006, 1007 and 1008, and 1009 associated with integer values on the rings of the respective tenants. The number of databases for each tenant varies depending on the scale of the tenant. The number of databases increases with increasing tenant scale. This diagram also shows servers 1011 to 1013 holding the databases. In this example, the databases for the three tenants are distributed and managed in the three print document management servers. As shown in this example, databases for a tenant are not necessarily held by a single server (the databases for the A-company are held by a server 1 and a server 3). A server does not necessarily hold databases only for a single tenant (the server 3 holds databases of the A-company and the C-company).

FIG. 11 is a diagram schematically showing the distributed management of FIG. 10 using the assignment information (database list) of FIG. 6B. This diagram shows assignment information (database lists) 1101, 1102, and 1103 of the A-company, the B-company, and the C-company respectively.

Figure 12:
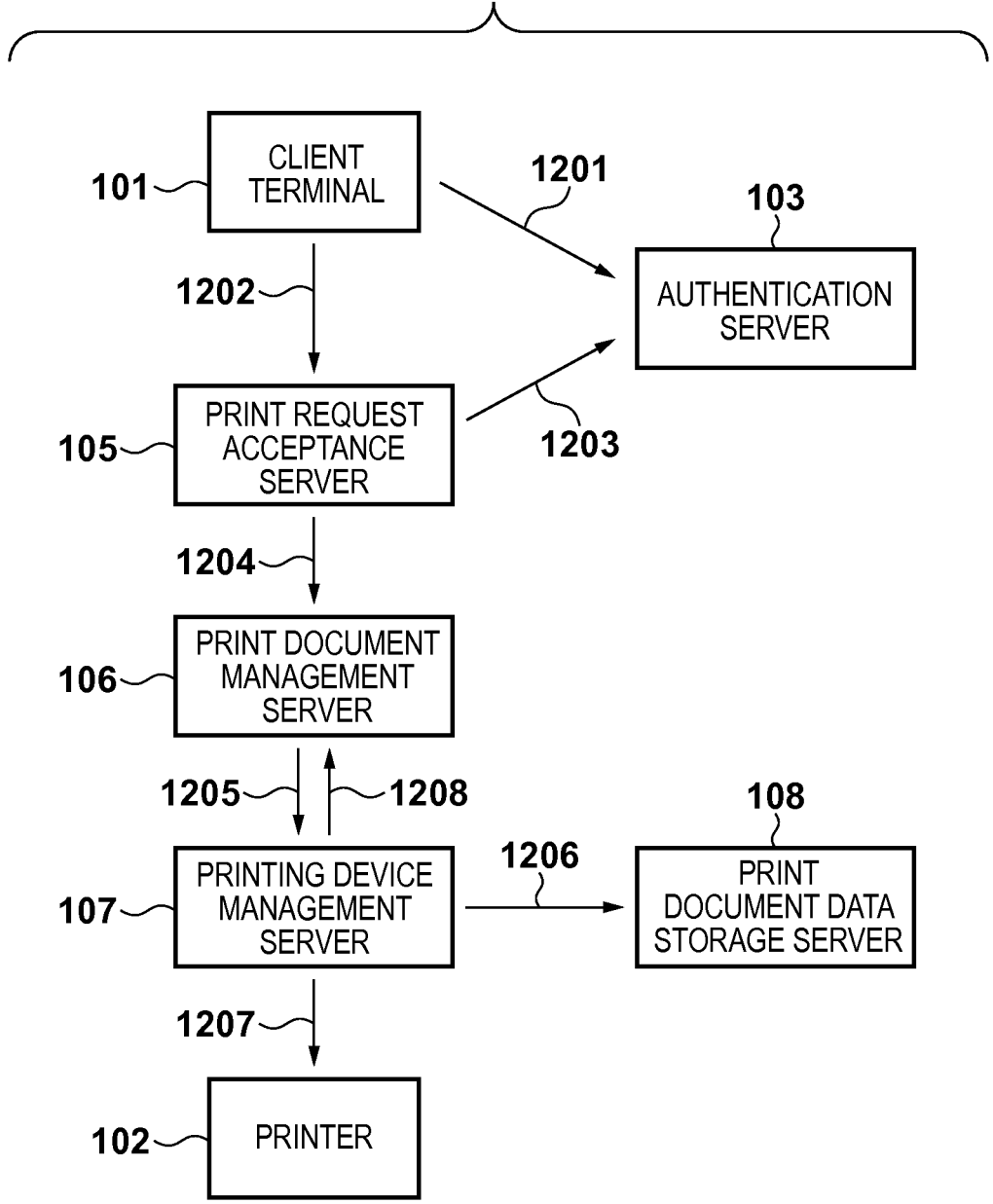
FIG. 12 is a diagram showing a process of printing performed in response to a print request from a client terminal.

Next, in the print document management system, a flow of a printing process which is performed in response to a print request from the client terminal 101 will be described with reference to FIG. 12. Initially, the client terminal 101 accepts a user ID and a password input by a user, and transmits a user authentication request to the authentication server 103 (1201). If user authentication is successful, the authentication server 103 returns a session ID to the client terminal 101. The client terminal 101 transmits the session ID received from the authentication server 103 and a print request to the print request acceptance server 105 in accordance with an instruction from the user (1202). Here, the print request contains an ID for identifying a print document, an ID for identifying the owner of the print document, and the name of a printer (print destination).

On the other hand, the print request acceptance server 105 which has accepted the print request transmits the session ID to the authentication server 103 (1203) to obtain a tenant ID belonging to the user who has requested printing. The print request acceptance server 105 designates a print document management server 106 based on the print document assignment information 419 using the tenant ID obtained from the authentication server 103 and the owner ID of a print document contained in the print request. The print request acceptance server transmits the tenant ID and the print request to the designated print document management server 106 (1204). After receiving the print request, the print document management server 106 transmits the tenant ID and the print request to a printing device management server 107 which is designated based on the printing device assignment information 418 using the tenant ID and the printer name contained in the print request (1205).

Here, if the transmission of the print request is successful, the print document management server 106 changes the state of the print document to "currently being printed." The printing device management server 107 which has received the print request obtains print document data associated with a print document ID contained in the print request, from the print document data storage server 108 (1206). Thereafter, the printing device management server converts the print document data into a format which can be interpreted by the printer 102, and transmits the resulting data to the printer 102 (1207).

When printing is completed in the printer 102, the printing device management server 107 transmits the tenant ID and a print completion notification to a print document management server 106 which is designated based on the print document assignment information 419 using the owner ID of the print document contained in the print request (1208). Here, the print completion notification contains the print document ID, the owner ID of the print document, and the print result. After receiving the print completion notification, the print document management server 106 changes the state of the print document to "already printed," and increments the number of times of printing by one.

Figure 13:
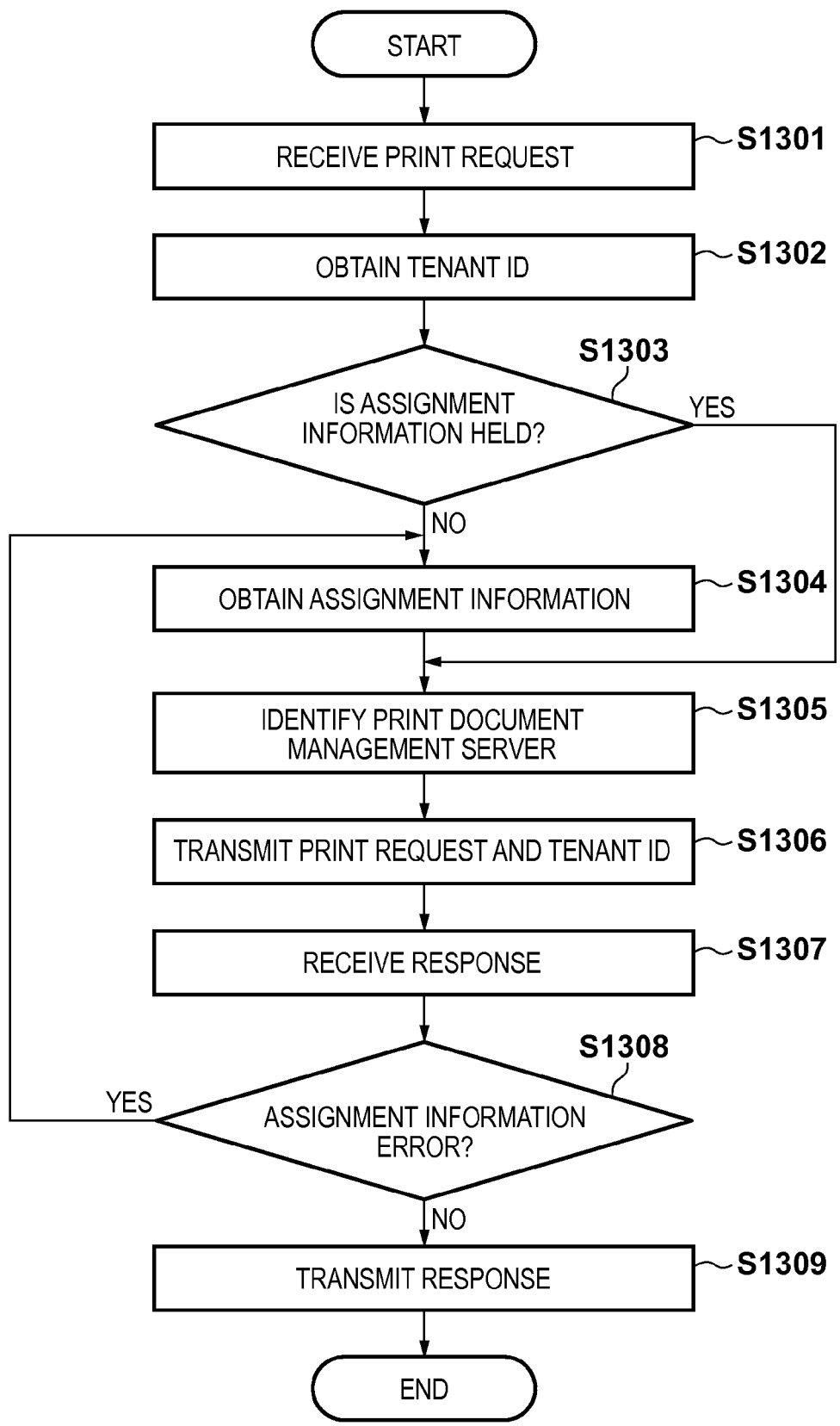
FIG. 13 is a flowchart showing a process performed by the print request acceptance server.

Flows (FIG. 12) of processes performed by the print request acceptance server 105, the print document management server 106, and the printing device management server 107 will now be described with reference to FIGS. 13 to 17. FIG. 13 is a flowchart showing the flow of the process performed by the print request acceptance server 105. The print request acceptance server 105 receives a session ID and a print request from the client terminal 101 in S1301, and transmits the session ID to the authentication server 103 to obtain a tenant ID in S1302. In S1303, the print request acceptance server 105 determines whether or not the obtained tenant ID is contained in the tenant list 611 of the print document assignment information (cache) 406 held in the print request acceptance server. If the determination result is positive, the process proceeds to S1305, and, otherwise, the process proceeds to S1304, in which the print document assignment information of a tenant identified by the tenant ID is obtained from the printing system management server 104.

In S1305, the print request acceptance server identifies individual-tenant information 612 using the tenant ID, and individual-database information 613 about a database storing print document information using a hash value calculated from the owner ID of the print document contained in the print request. Next, in S1306, the print request acceptance server transmits the print request and the tenant ID to a print document management server 106 having a server IP address contained in the individual-database information 613 identified in S1305. The print request acceptance server receives a response from the print document management server 106 in S1307, and determines whether or not the response is an assignment information error in S1308. Here, if it is determined that the response is an assignment information error, there is a possibility that the print document assignment information 315 held by the printing system management server 104 has been updated. Therefore, the process returns to S1304, in which the print request acceptance server obtains the print document assignment information of a tenant identified by the tenant ID from the printing system management server 104. On the other hand, if it is determined that the response from the print document management server 106 is not an assignment information error, the process proceeds to S1309, in which the print request acceptance server returns a response to the client terminal 101.

Note that steps S1301 and S1309 are executed by the print request acceptance unit 402 of the print request acceptance server 105. Step S1302 is executed by the tenant identifier obtaining unit 403. Steps S1303 and 1304 are executed by the assignment information obtaining unit 401. Step S1305 is executed by the print document management server designation unit 404. Steps S1307 and 1308 are executed by the print request transmission unit 405.

Figure 14:
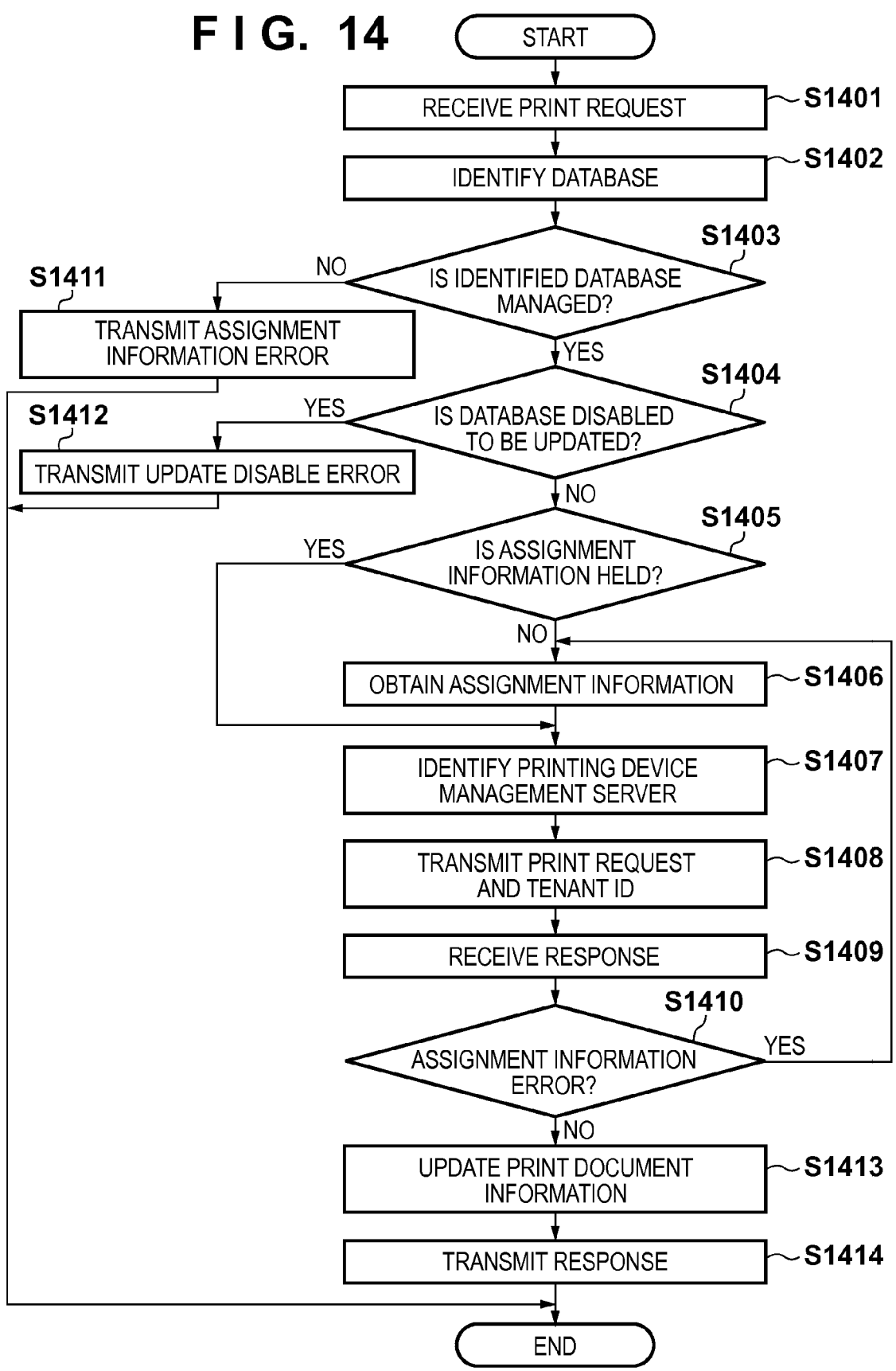
FIG. 14 is a flowchart showing a process of the print document management server.

FIG. 14 is a flowchart showing the flow of the process performed by the print document management server 106. In S1401, the print document management server 106 receives a tenant ID and a print request from the print request acceptance server 105. In S1402, the print document management server 106 identifies individual-tenant information 612 using the tenant ID by referencing the print document assignment information (cache) 419 held by the print document management server. Specifically, the print document management server identifies individual-database information 613 about a database storing print document information, using a hash value calculated from the owner ID of a print document contained in the print request. Next, in S1403, the print document management server 106 determines whether or not the database identified in S1402 is contained in the print document information 417 held by the print document management server. If the determination result is negative, the process proceeds to S1411, in which the print document management server returns an assignment information error as a response to the print request acceptance server 105. If the determination result of S1403 is positive, the process proceeds to S1404, in which the print document management server determines whether or not the update disable flag in the individual-database information 613 is set. If the determination result is positive, it is during scaling out, and therefore, the process proceeds to S1412, in which the print document management server returns an update disable error as a response to the print request acceptance server 105.

On the other hand, if the determination result of S1404 is negative, the process proceeds to S1405. In S1405, the print document management server 106 determines whether or not the tenant ID received from the print request acceptance server 105 is contained in the tenant list 611 of the printing device assignment information (cache) 418 held by the print document management server. If the determination result is positive, the process proceeds to S1407, and, otherwise, the process proceeds to S1406, in which the print document management server obtains the printing device assignment information of a tenant identified by the tenant ID from the printing system management server 104.

In S1407, the print document management server identifies individual-tenant information 612 using the tenant ID, and individual-database information 613 about a database storing printing device information using a hash value calculated from a printer name contained in the print request. In S1408, the print document management server transmits the print request and the tenant ID to the printing device management server 107 having a server IP address contained in the individual-database information 613 identified in S1407. The print document management server receives a response from the printing device management server 107 in S1409, and determines whether or not the response is an assignment information error in S1410. Here, if it is determined that the response is an assignment information error, there is a possibility that the print document assignment information 315 held by the printing system management server 104 has been updated. Therefore, the process returns to S1406, in which the print document management server obtains the print document assignment information of a tenant identified by the tenant ID from the printing system management server 104. On the other hand, if it is determined that the response from the printing device management server 107 is not an assignment information error, the process proceeds to S1413, in which the print document management server changes the status of individual-print document information 705 identified by a print document ID contained in the print request to "currently being printed." In S1414, the print document management server returns a response to the print request acceptance server 105.

Note that steps S1401 to S1404, S1411, S1412, and S1414 are executed by the print request reception unit 413 of the print document management server 106. Steps S1405 and S1406 are executed by the assignment information obtaining unit 412. Step S1407 is executed by the printing device management server designation unit 414. Steps S1408 to S1410 are executed by the print request transmission unit 415. Step S1413 is executed by the print document management unit 411.

In the process flow of FIG. 14, in S1406, the print document management server obtains the printing device assignment information of a tenant identified by a tenant ID received from the print request acceptance server 105. However, the print document management server may obtain printing device assignment information from the printing system management server 104 at a time different from that when a print request is accepted. In this case, the assignment information obtaining unit 412 obtains the printing device assignment information of a tenant identified by the tenant ID of print document information managed by the print document management unit 411.

Figure 15:
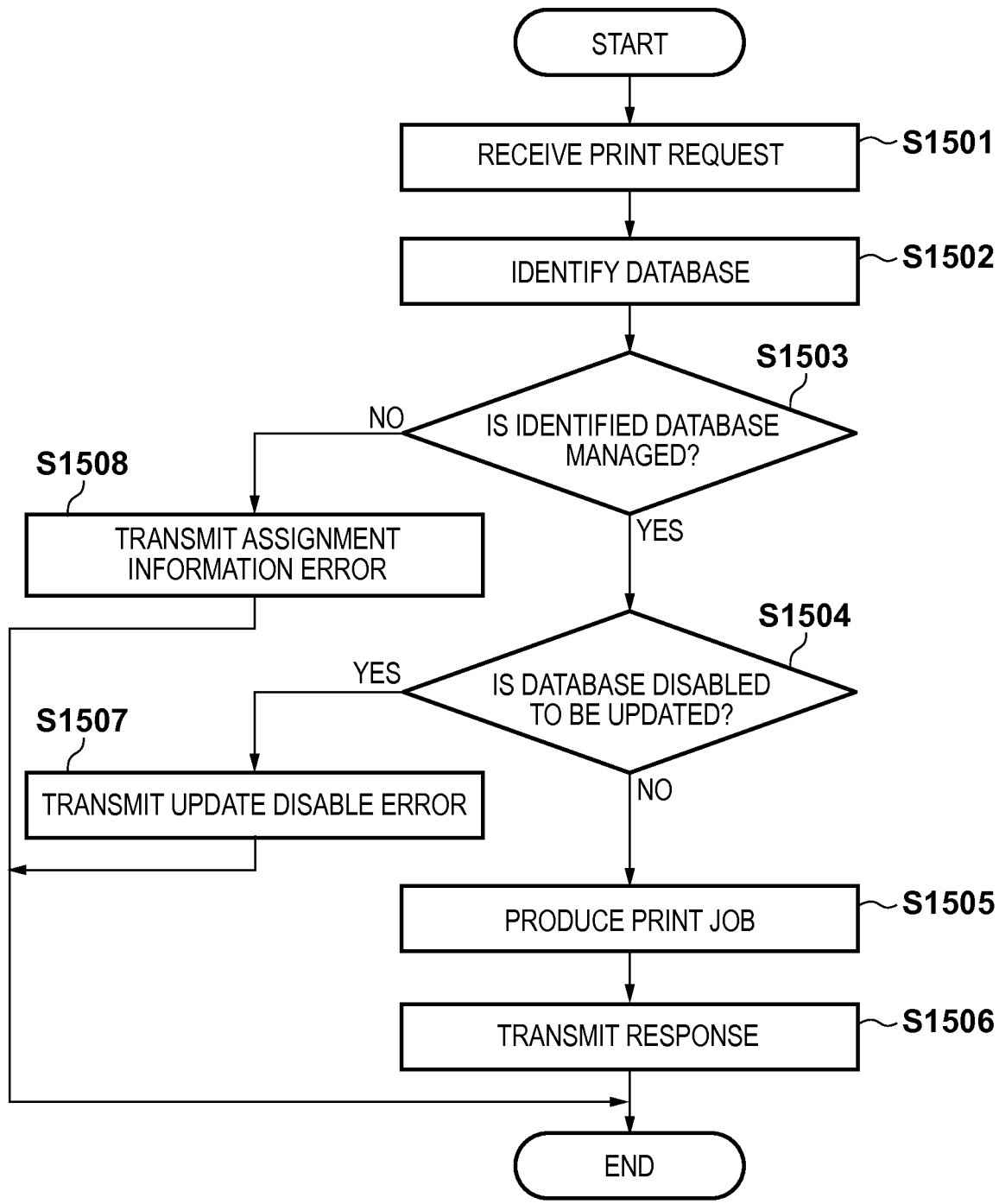
FIG. 15 is a flowchart showing a process of the printing device management server.

FIG. 15 is a flowchart showing the flow of the process performed by the printing device management server 107. In S1501, the printing device management server 107 receives a tenant ID and a print request from the print document management server 106. In S1502, the printing device management server 107 identifies individual-tenant information 612 using the tenant ID by referencing the printing device assignment information (cache) 510 held by the printing device management server. The printing device management server identifies individual-database information 613 about a database storing printing device information using a hash value calculated from a printer name contained in the print request. In S1503, the printing device management server 107 determines whether or not the database identified in S1502 is contained in the printing device information 508 held by the printing device management server. If it is determined that the database is not contained, the process proceeds to S1508, in which the printing device management server returns an assignment information error as a response to the print document management server 106.

On the other hand, if it is determined in S1503 that the database identified in S1502 is contained, the process proceeds to S1504. In S1504, the printing device management server determines whether or not the update disable flag of the individual-database information 613 is set. Here, if the determination result is positive, it is during scaling out, and therefore, the process proceeds to S1507, in which the printing device management server returns an update disable error as a response to the print document management server 106. If the determination result is negative, the process proceeds to S1505, in which the printing device management server produces a print job. In the print job, the tenant ID, the owner ID of the print document, and the print document ID which are contained in the print request are saved. Thereafter, in S1506, the printing device management server returns a response to the print document management server 106.

Note that steps S1501 to S1504, S1506, S1507, and S1508 are executed by the print request reception unit 503 of the printing device management server 107. Step S1505 is executed by a printing process unit.

Figure 16:
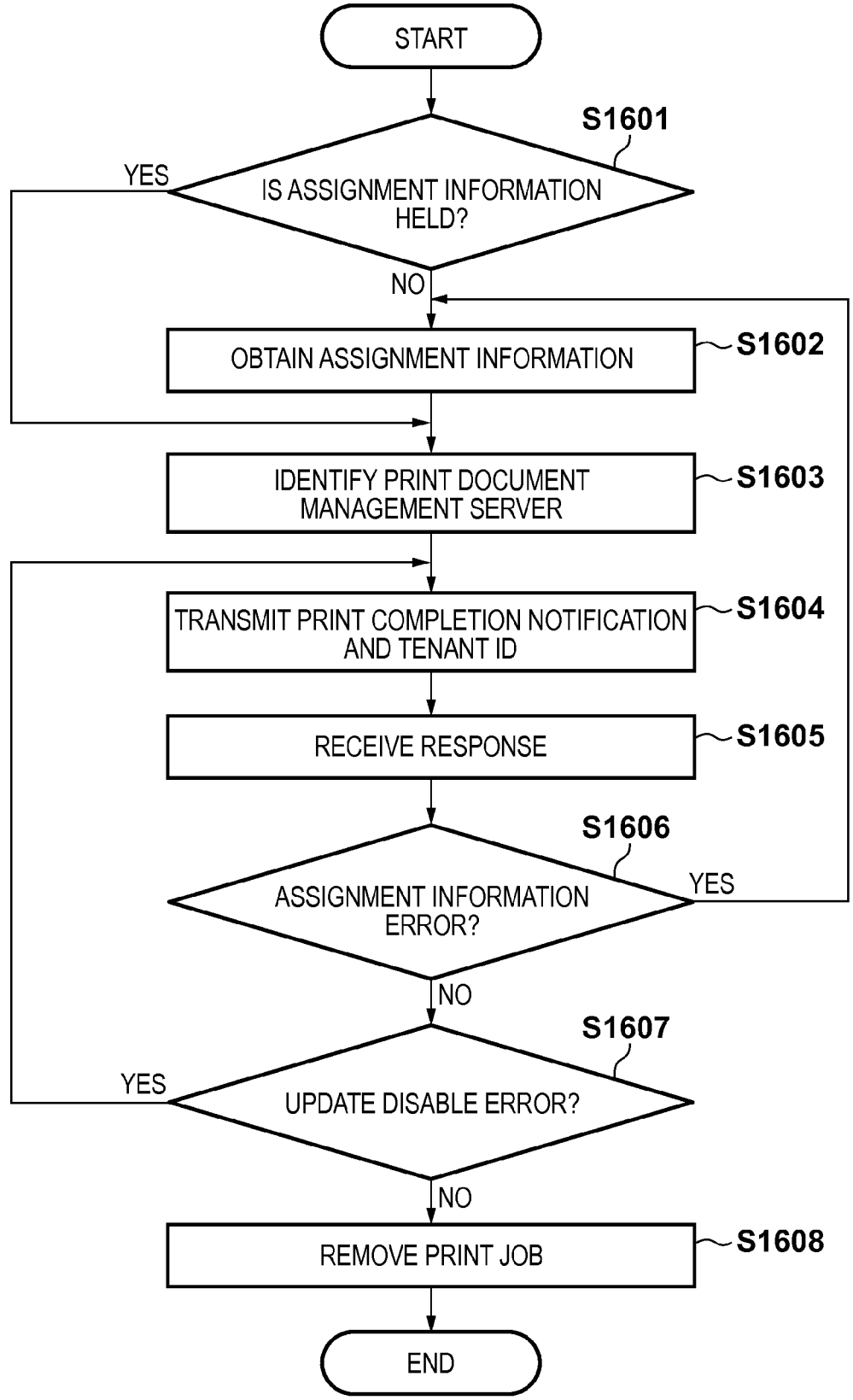
FIG. 16 is a flowchart showing a process of the printing device management server which has detected completion of printing of a printer.

FIG. 16 is a flowchart showing the flow of the process performed by the printing device management server 107 which has detected completion of printing of the printer 102. In S1601, the printing device management server 107 determines whether or not the tenant ID of a print job is contained in the tenant list 611 of the print document assignment information (cache) 509 held by the printing device management server. Here, if the determination result is positive, the process proceeds to S1603, and, otherwise, the process proceeds to S1602. In S1602, the printing device management server obtains the print document assignment information of a tenant identified by the tenant ID from the printing system management server 104.

In S1603, the printing device management server identifies individual-tenant information 612 using the tenant ID, and individual-database information 613 about a database storing print document information using a hash value calculated from the owner ID of a print document contained in the print job. In S1604, the printing device management server transmits a print completion notification and the tenant ID to the print document management server 106 having a server IP address contained in the individual-database information 613 identified in S1603. Thereafter, the printing device management server receives a response from the print document management server 106 in S1605, and determines whether or not the response is an assignment information error in S1606. Here, if it is determined that the response is an assignment information error, there is a possibility that the print document assignment information 315 held by the printing system management server 104 has been updated. Therefore, the process returns to S1602, in which the printing device management server obtains the print document assignment information of a tenant identified by the tenant ID from the printing system management server 104.

On the other hand, if it is determined in S1606 that the response from the print document management server 106 is not an assignment information error, the process proceeds to S1607, in which the printing device management server determines whether or not the response is an update disable error. Here, if the determination result is positive, the process proceeds to S1604, in which the printing device management server transmits a print completion notification and the tenant ID again. If the determination result of S1607 is negative, the process proceeds to S1608, in which the printing device management server removes the print job.

Note that steps S1601 and S1602 are executed by the assignment information obtaining unit 502 of the printing device management server 107. Step S1603 is executed by the print document management server designation unit 504. Steps S1604 to S1607 are executed by the print result notification unit 506. Step S1608 is executed by the printing process unit 505.

In the process flow of FIG. 16, in S1602, the printing device management server obtains the print document assignment information of a tenant identified by the tenant ID of the print job. However, the printing device management server may obtain print document assignment information from the printing system management server 104 at a time different from that when the printing device management server detects completion of printing. In this case, the assignment information obtaining unit 502 obtains the printing device assignment information of a tenant identified by the tenant ID of printing device information managed by the printing device management unit 501.

Figure 17:
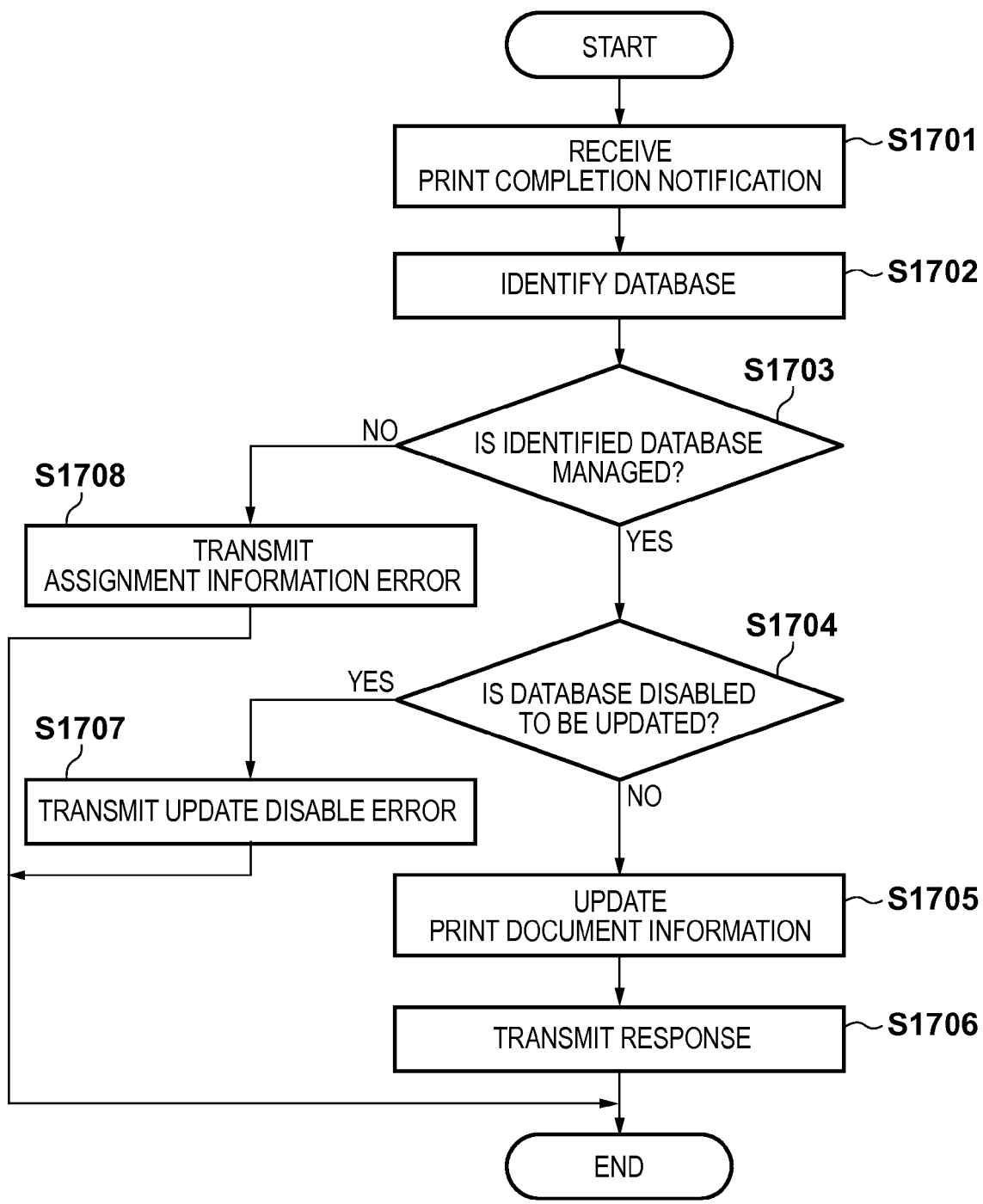
FIG. 17 is a flowchart showing a process of the print document management server which has received a print completion notification from the printing device management server.

FIG. 17 is a flowchart showing the flow of the process performed by the print document management server 106 which has received a print completion notification from the printing device management server 107. In S1701, the print document management server 106 receives a tenant ID and a print completion notification from the printing device management server 107. In S1702, the print document management server 106 identifies individual-tenant information 612 using the tenant ID by referencing the print document assignment information (cache) 419 held by the print document management server. Specifically, the print document management server identifies individual-database information 613 about a database storing print document information using a hash value calculated from the owner ID of a print document contained in the print completion notification.

In S1703, the print document management server 106 determines whether or not the database identified in S1702 is contained in the print document information 417 held by the print document management server. Here, if it is determined that the database is not contained, the process proceeds to S1708, in which the print document management server returns an assignment information error as a response to the printing device management server 107. However, if it is determined that the database identified in S1702 is contained, the process proceeds to S1704, in which the print document management server determines whether or not the update disable flag of the individual-database information 613 is set. Here, if the determination result is positive, it is during scaling out, and therefore, the process proceeds to S1707, in which the print document management server returns an update disable error as a response to the printing device management server 107. If the determination result is negative, the process proceeds to S1705, in which the print document management server changes the status of individual-print document information 705 identified by a print document ID contained in the print completion notification to "already printed." Thereafter, in S1706, the print document management server returns a response to the printing device management server 107.

Note that steps S1701 to S1704, S1706, S1707, and S1708 are executed by the print completion notification reception unit 420 of the printing device management server 107. Step S1705 is executed by the print document management unit 411.

Next, a process in which scaling out is performed while a tenant is designated in the print document management system will be described with reference to FIGS. 18 to 23. When an instruction to perform scaling out is given to the printing system management server 104, the printing system management server 104 moves databases held by the print document management server 106 and the printing device management server 107. When a database is moved, it is necessary to temporarily disable the database to be updated while a service for tenants other than a tenant for which scaling out is performed is not stopped. Therefore, only a database for a tenant for which scaling out is performed is moved. Note that if a database of a tenant is distributed in a large number of servers, the cost of a process performed on a tenant-by-tenant basis is high. Therefore, the number of servers which manage the same tenant, even after scaling out, needs to be minimized.

Figure 18:
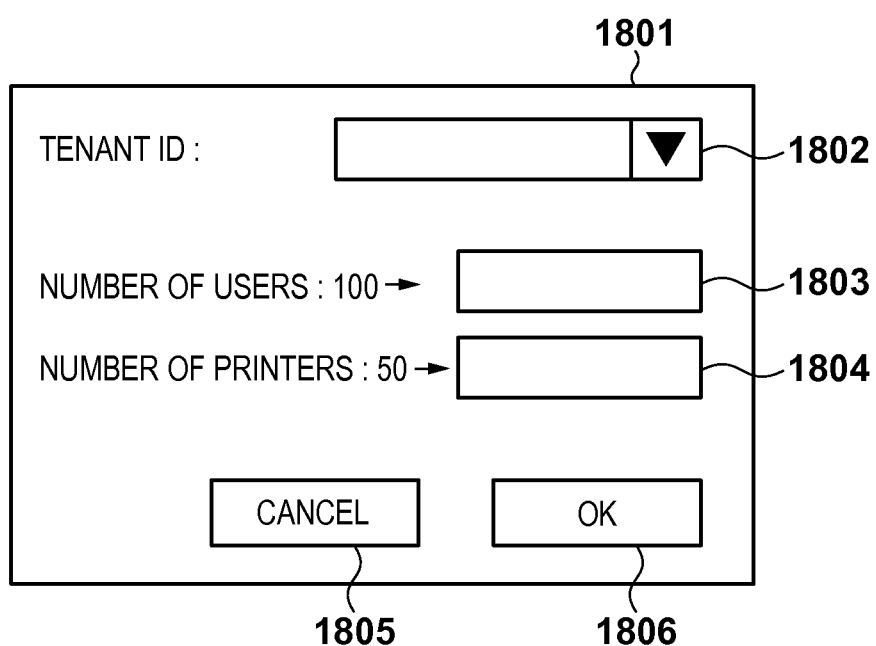
FIG. 18 is a diagram showing a user interface for instructing to perform scaling out.

FIG. 18 is a diagram showing a user interface for instructing the printing system management server 104 to perform scaling out. A user interface screen 1801 includes a list box 1802 which is used to select a tenant for which scaling out is to be executed, and edit boxes 1803 and 1804 which are used to input the number of users and the number of printers which are expected after scaling out. Based on values input to the edit boxes 1803 and 1804, the printing system management server 104 determines the number of databases of print document information and printing device information, and divides and moves existing databases. The user interface screen 1801 also includes a cancel button 1805 and an OK button 1806, and, if the OK button 1806 is pressed, a scale-out request is transmitted to the printing system management server 104. The scale-out request contains values which have been input on the user interface screen 1801 to instruct to perform scaling out.

Figure 19:
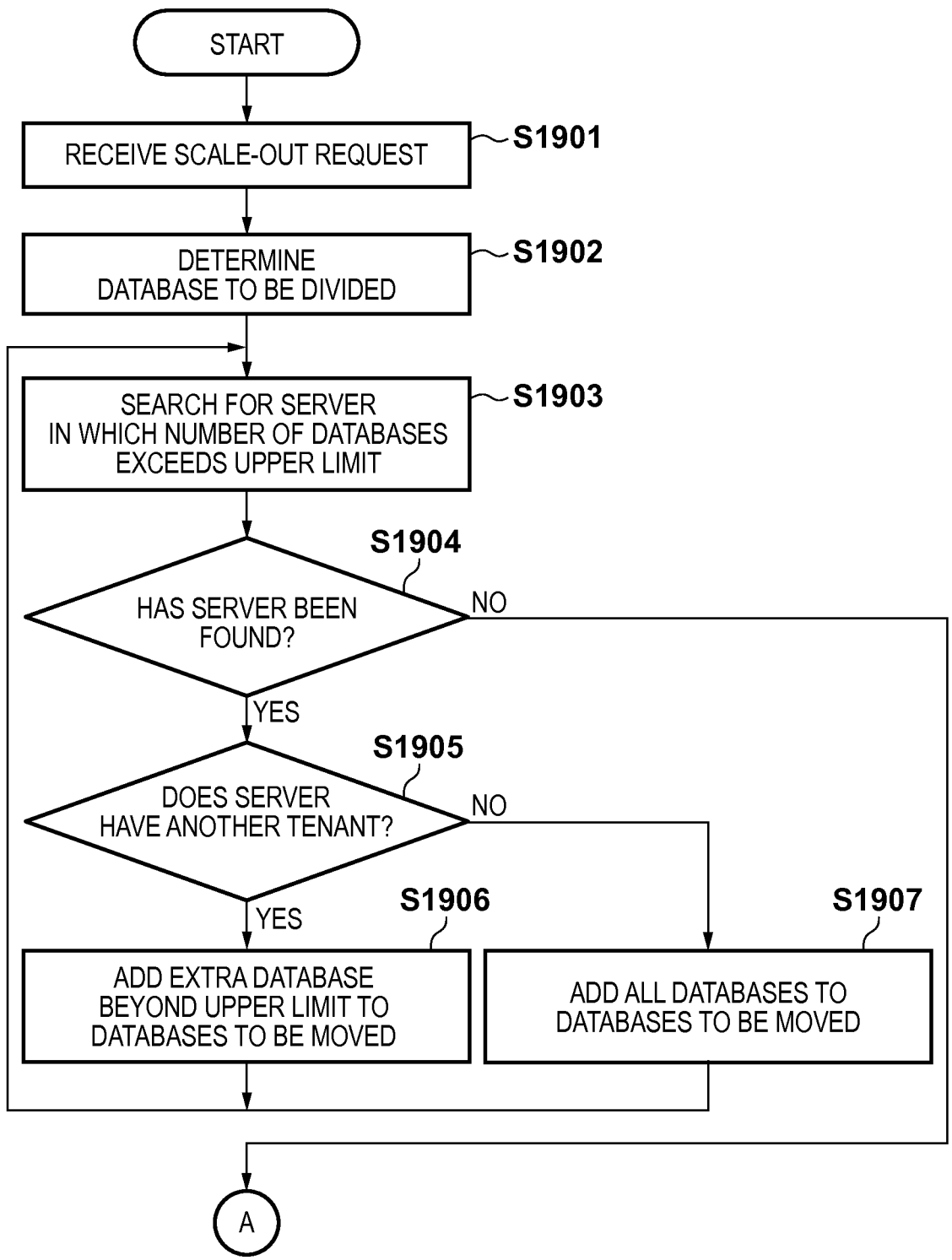
FIG. 19 is a flowchart showing a process of the printing system management server which has received a scale-out request.
Figure 20:
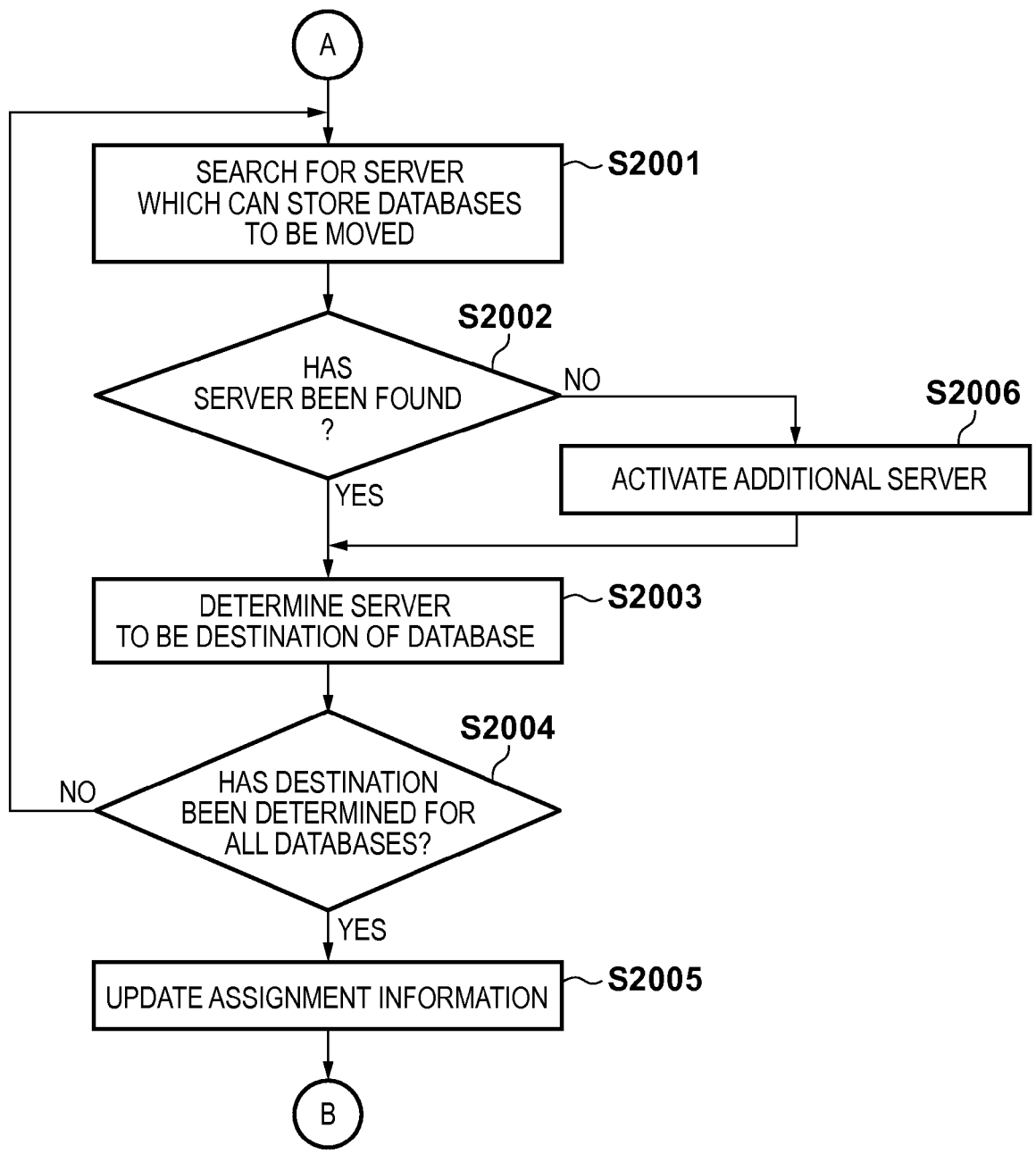
FIG. 20 is a flowchart showing a process of the printing system management server which has received a scale-out request.
Figure 21:
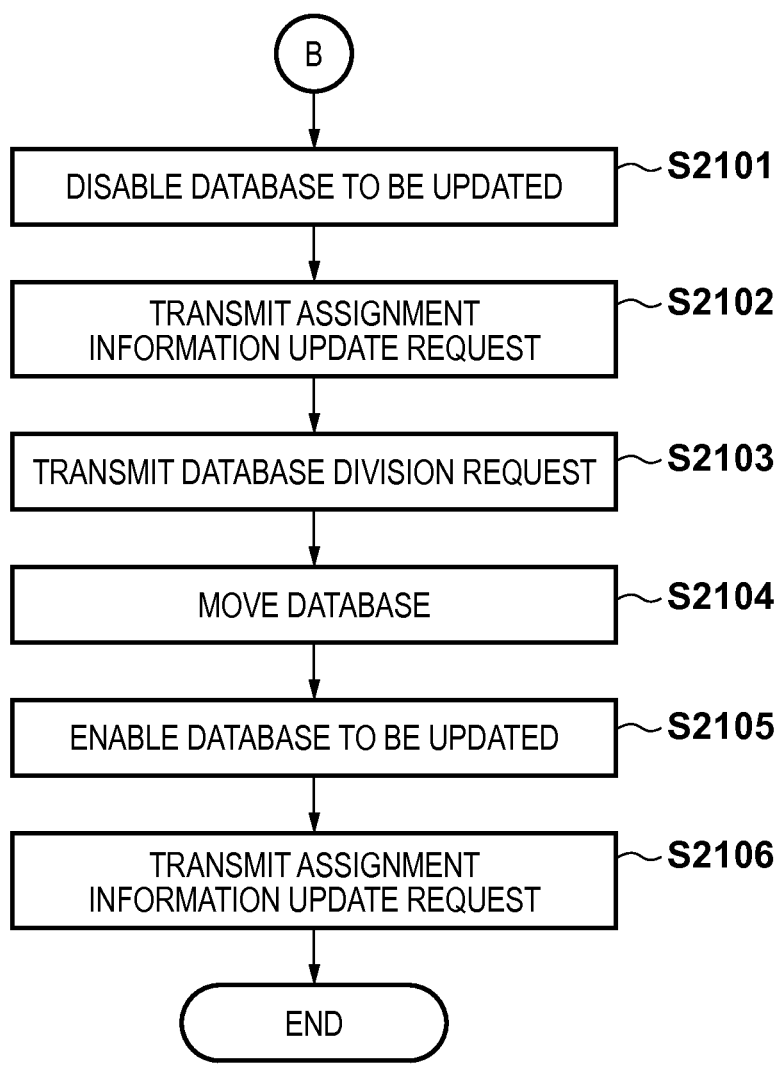
FIG. 21 is a flowchart showing a process of the printing system management server which has received a scale-out request.

FIGS. 19 to 21 are flowcharts showing a flow of a process performed by the printing system management server 104 which receives a scale-out request. In S1901, the printing system management server receives a scale-out request. The scale-out request contains values 1802 and 1803 indicating the number of users and the number of printers, respectively, specified on the user interface screen 1801. In S1902, based on the values contained in the scale-out request, the printing system management server determines the number of portions into which databases of print document information and printing device information are to be divided, and databases to be divided. Here, as the number of users increases, the number of portions into which a database of print document information is to be divided is increased. Also, as the number of printers increases, the number of portions into which a database of print device information is to be divided is increased.

Next, in S1903, the printing system management server searches for a server which holds a database or databases the number of which exceeds an upper limit due to the database division. In S1904, if the printing system management server determines that a server for which the upper limit is exceeded has been found, the process proceeds to S1905, in which the printing system management server determines whether or not the server for which the upper limit is exceeded also has a database for a tenant other than the tenant for which scaling out is to be executed. If the determination result is negative, the process proceeds to S1907, in which the printing system management server adds all database(s) for the tenant for which scaling out is to be executed, to databases to be moved, and returns to S1903.

On the other hand, if the determination result is positive, the process proceeds to S1906, in which the printing system management server adds an extra database(s) beyond the upper limit of the number of databases held by a server, to databases to be moved, and the process returns to S1903. Thereafter, the above process is repeated until no server for which the upper limit is exceeded is found in S1904.

If no server for which the upper limit exceeded is found in S1904, the process proceeds to S2001 (FIG. 20), in which the printing system management server searches for a server which can store all databases to be moved (the upper limit of the number of databases is not exceeded). If such a server has been found in S2002, the process proceeds to S2003. Otherwise, the process proceeds to S2005, in which an additional server is activated, and then proceeds to S2003.

In S2003, the server found in S2002 or the server activated in S2005 is determined to be a destination of a database(s) until the number of databases in the server reaches the upper limit. In S2004, the printing system management server determines whether or not a destination has been determined for all databases to be moved, and, if the determination result is negative, the process returns to S2001.

On the other hand, if the determination result is positive, the process proceeds to S2005, in which the assignment information (315, 316) held in the printing system management server 104 is updated based on the database division. Next, in S2101 (FIG. 21), the printing system management server sets the update disable flags of all the individual-database information 613 contained in the assignment information of the tenant for which scaling out is to be executed. Thereafter, in S2102, the printing system management server transmits the assignment information and an assignment information update request to all print document management servers and printing device management servers holding the assignment information cache.

Next, in S2103, the printing system management server transmits a database divide request to the print document management server and the printing device management server which hold the databases to be divided in S1902 of FIG. 19. The print document management server, when receiving the database divide request, executes database division using the database division unit 416. The printing device management server, when receiving the database divide request, executes database division using the database division unit 507. Thereafter, in S2104, the printing system management server moves the databases determined to be moved in S1906 and S1907 of FIG. 19 to a server which has been determined to be a destination in S2003 of FIG. 20. Next, in S2105, the printing system management server resets the update disable flags of all the individual-database information 613 contained in the assignment information of the tenant for which scaling out is to be executed so update is possible. Thereafter, in S2102, the printing system management server transmits the assignment information and an assignment information update request to all print document management servers and printing device management servers holding the assignment information cache.

Note that step S1901 of FIG. 19 is executed by the scale-out request acceptance unit 317 of the printing system management server 104. Steps S1902 to S1905 and S1907 are executed by the movement database determination unit 312. Steps S2001 to S2004 and S2005 of FIG. 20 are executed by the database movement destination determination unit 313. Step S2005 is executed by the assignment information management unit 311. Steps S2101 to S2106 of FIG. 21 are executed by the database movement execution unit 314.

Figure 22A:
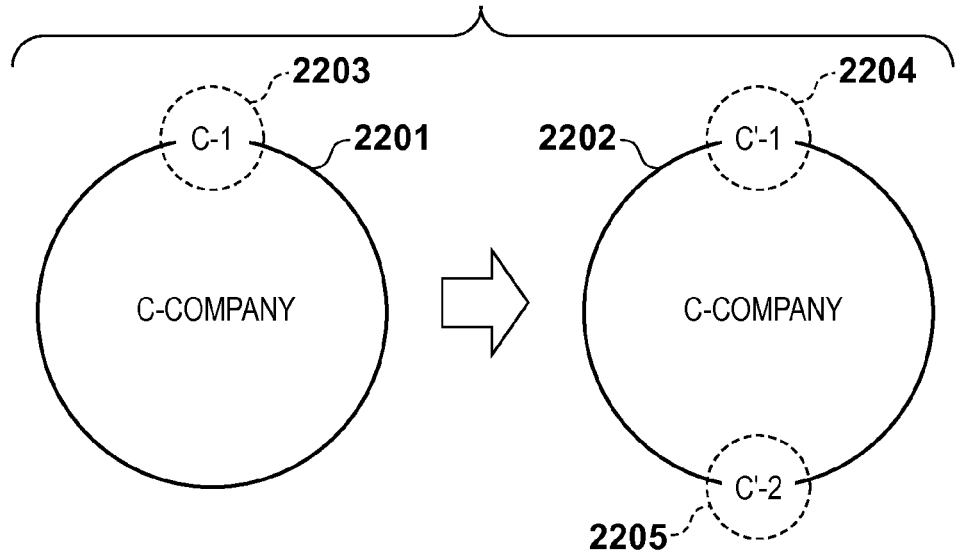
FIG. 22A is a diagram schematically showing a process of dividing a database when scaling out is performed for a tenant.

FIG. 22A is a diagram schematically showing a process of dividing a database when scaling out is performed for a tenant. Rings 2201 and 2202 of FIG. 22A correspond to the ring 901 of FIG. 9A before and after division. In this example, while only a database 2203 is provided before division, two databases 2204 and 2205 are provided after division. In this case, after division, a portion of data stored in the database 2203 is moved to the database 2205, and the remainder of the data which has not been moved is stored in the database 2204.

Figure 22B:
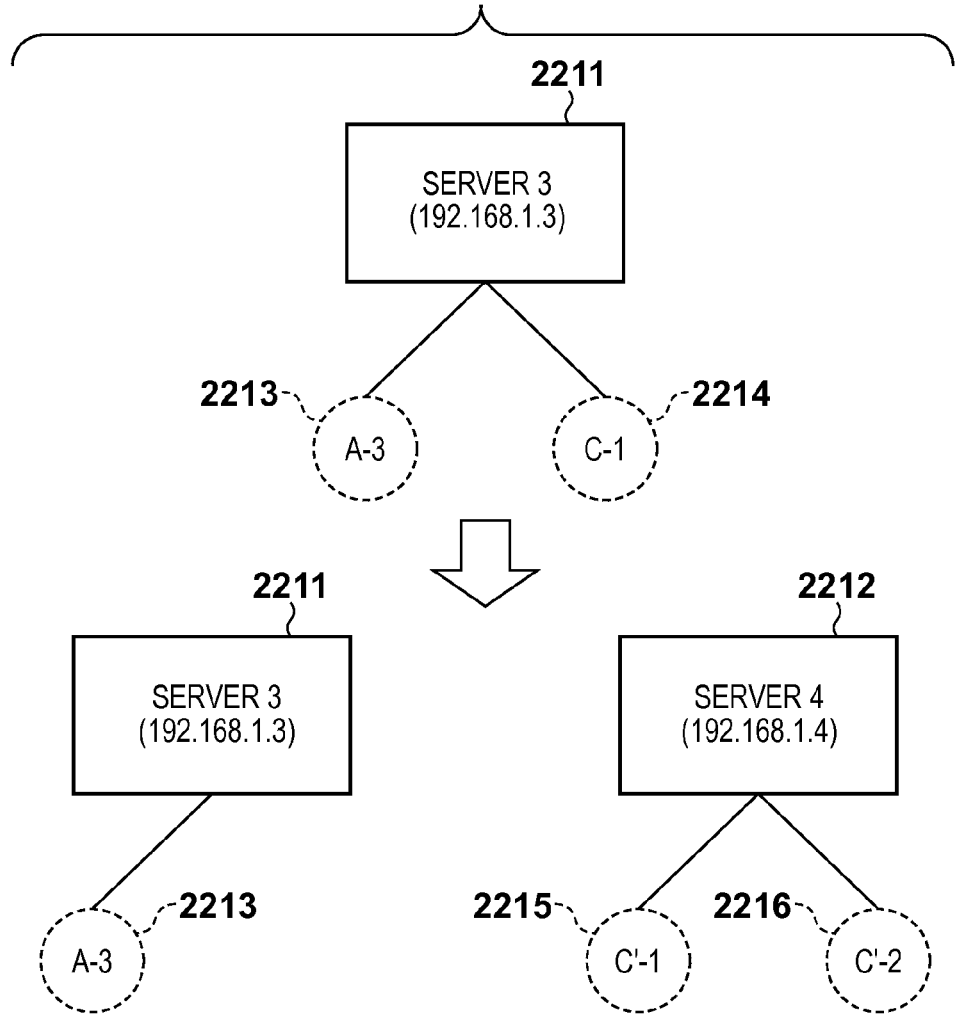
FIG. 22B is a diagram schematically showing a process of moving a database obtained by division when scaling out is performed for a tenant.

FIG. 22B is a diagram schematically showing a process of moving a database obtained by division when scaling out is performed for a tenant. A server 2211 holds a database 2213 for an A-company and a database 2214 for a C-company. Thereafter, the database 2214 of the server 2211 is divided, so that the number of databases held in the server exceeds the upper limit, and therefore, the database is moved as databases 2215 and 2216 to an additional server 2212 which is newly activated.

FIG. 23 is a diagram schematically showing a process of moving a database obtained by division as shown in FIG. 22B, using the assignment information (database list) of FIG. 6B. In this example, assignment information (database list) 2301, 2302, and 2303 of an A-company, a B-company, and a C-company are changed, after division, into assignment information (database list) 2304, 2305, and 2306 of the A-company, the B-company, and the C-company.

According to the above embodiment, a data management method of a print document management service which can easily perform a process on a tenant-by-tenant basis while reducing the operation cost of the entire service, can be provided.

Since only a database(s) for a tenant for which scaling out is to be executed is moved, scaling out can be executed without stopping a service for a tenant other than a tenant for which scaling out is to be executed.

When a database is divided in a server which also has a database for another tenant, then if the number of databases held in the server exceeds the upper limit, all database(s) for a tenant for which scaling out is to be executed is moved to an additional server which is newly activated. As a result, the number of servers which manage the same tenant, even after scaling out, can be minimized.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106626, filed May 11, 2011, which is hereby incorporated by reference herein in its entirety.

What is claimed is:

1. A system management server for assigning print document information or printing device information of a tenant to a plurality of servers to perform distributed management in a printing system, the server comprising:

a holding unit constructed to divide integer values within a specific range per a predetermined range, and to hold assignment information including integer values indicating that each of divided value ranges is assigned uniquely to each of the plurality of servers;

a calculation unit constructed to receive print document information or printing device information, and to calculate a value based on the received print document information or printing device information;

a designation unit constructed to designate, from a plurality of the divide value ranges, a value range in which the value calculated by the calculation unit is included, and further to designate, after designating the value range in which the value calculated by the calculation unit is included, a server assigned to the designated value range;

a storage unit constructed to store the print device information in the server designated by the designation unit;

a search unit constructed to search the plurality of servers for a server for managing a given tenant when print document information or printing device information of the given tenant is divided and the divided print device information is moved to another server;

a determination unit constructed to determine the server found by the search unit to be a destination server of the movement when the server is allowed to store the divided print document information or printing device information; and a movement unit constructed to move the divided print document information or printing device information to the destination server determined by the determination unit, wherein when the search unit fails to find a server, the determination unit activates an additional server, and determines the additional server to be a destination server, wherein, when moving the print document information or printing device information of the given tenant from a shared server for managing the given tenant and another tenant to the activated new server, print document information or printing device information of the other tenant is left in the share server and all of the print document information or all of the printing device information of the given tenant is moved to the activated new server, and wherein, after moving all of the print document information or all of the printing device information of the given tenant to the activated new server, the holding unit changes the predetermined range of assignment information in accordance with division of the integer values within the specific range, and re-assigns each of the changed value ranges uniquely to each of the plurality of servers.

2. The system management server according to claim 1, wherein
the search unit, when the found server is not allowed to store the divided print document information or printing device information, adds print document information or printing device information managed by the found server to a target to be moved, and searches for a server which is allowed to store the print document information or the printing device information.

3. The system management server according to claim 1, further comprising:
a setting unit constructed to disable the print document information or printing device information of the given tenant to be updated when the print document information or the printing device information is divided and the divided print device information is moved to another server.

4. The system management server according to claim 1, wherein
when the print document information or printing device information of the given tenant is divided and the divided print device information is moved to another server, the movement unit does not move print document information or printing device information of the tenants other than the given tenant.

5. The system management server according to claim 1, wherein
when the print document information or printing device information of the given tenant is divided and the divided print device information is moved to another server, then if an additional server or servers are activated, the determination unit determines a destination server or servers so that the number of the servers is minimum.

6. A management method executed in a system management server for assigning print document information or printing device information of a tenant to a plurality of servers to perform distributed management in a printing system, the method comprising:
dividing integer values within a specific range per a predetermined range, and holding assignment information including integer values indicating that each of the divided value ranges is assigned uniquely to each of the plurality of servers;
receiving print document information or printing device information, and calculating a value based on the received print document information or printing device information;
designating, from a plurality of the divided value ranges, a value range in which the calculated value is included, and further designating, after designating the value range in which the calculated value is included, a server assigned to the designated value range;
storing the print device information in the designated server;
searching the plurality of servers for a server for managing a given tenant when print document information or printing device information of the given tenant is divided and the divided print device information is moved to another server;
determining the server found by the search to be a destination server of the movement when the server is allowed to store the divided print document information or printing device information; and
moving the divided print document information or printing device information to the determined destination server,
wherein when a server is not found in the searching step, in the determining step, an additional server is activated and the additional server is determined as a destination server,
wherein, when moving the print document information or printing device information of the given tenant from a shared server for managing the given tenant and another tenant to the activated new server, print document information or printing device information of the other tenant is left in the share server and all of the print document information or all of the printing device information of the given tenant is moved to the activated new server, and
wherein, after moving all of the print document information or all of the printing device information of the given tenant to the activated new server, in the holding step, the predetermined range of assignment information is changed in accordance with division of the integer values within the specific range, and each of the changed value ranges is re-assigned uniquely to each of the plurality of servers.

7. A non-transitory computer-readable storage medium storing a program for causing a computer to execute the management method of claim 6.

8. A printing system including a client and a system management server for assigning print document information or printing device information of a tenant to a plurality of servers to perform distributed management, comprising:
a holding unit constructed to divide integer values within a specific range per a predetermined range, and to hold assignment information including the integer values indicating that each of the divided value ranges is assigned uniquely to each of the plurality of servers;
a calculation unit constructed to receive print document information or printing device information, and to calculate a value based on the received print document information or printing device information;
a designation unit constructed to designate, from a plurality of the divided value ranges, a value range in which the value calculated by the calculation unit is included, and further to designate, after designating the value range in which the value calculated by the calculation unit is included, a server assigned to the designated value range;
a storage unit constructed to store the print device information in the server designated by the designation unit;
a search unit constructed to search the plurality of servers for a server for managing a given tenant when print document information or printing device information of the given tenant is divided and the divided print device information is moved to another server;
a determination unit constructed to determine the server found by the search unit to be a destination server of the movement when the server is allowed to store the divided print document information or printing device information; and a movement unit constructed to move the divided print document information or printing device information to the destination server determined by the determination unit, wherein when the search unit fails to find a server, the determination unit activates an additional server, and determines the additional server to be a destination server, wherein, when moving the print document information or printing device information of the given tenant from a shared server for managing the given tenant and another tenant to the activated new server, print document information or printing device information of the other tenant is left in the share server and all of the print document information or all of the printing device information of the given tenant is moved to the activated new server, and wherein, after moving all of the print document information or all of the printing device information of the given tenant to the activated new server, the holding unit changes the predetermined range of assignment information in accordance with division of the integer values within the specific range, and re-assigns each of the changed value ranges uniquely to each of the plurality of servers.

* * * * *